(12) United States Patent
Van Horne et al.

(10) Patent No.: US 6,233,604 B1
(45) Date of Patent: May 15, 2001

(54) COMMUNICATIONS NETWORK CONNECTION SYSTEM AND METHOD

(75) Inventors: Peter Van Horne; Keith Olson; Kevin Miller, all of San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/289,199

(22) Filed: Apr. 9, 1999

Related U.S. Application Data

(62) Division of application No. 08/919,397, filed on Aug. 28, 1997, now Pat. No. 5,987,430.

(51) Int. Cl.[7] .................................................. G06F 15/16
(52) U.S. Cl. .................... 709/203; 709/202; 709/217; 709/218; 709/219; 709/227
(58) Field of Search .................................... 709/203, 202, 709/217, 218, 219, 227

(56) References Cited

U.S. PATENT DOCUMENTS 6,173,406 * 1/2001 Wang et al. ......................... 713/201
6,189,019 * 2/2001 Blumer et al. ....................... 707/513

* cited by examiner

*Primary Examiner*—Thomas R. Peeso
(74) *Attorney, Agent, or Firm*—Thelen Reid & Priest LLP; David B. Ritchie

(57) ABSTRACT

A system and method for remotely connecting client computers to a communication network such as the Internet by way of a server system handling a plurality of client computers and having the capability of dynamically providing network connections to the client computers, separately billing usage time and tracking usage and preferably updating access software on the client computers.

30 Claims, 13 Drawing Sheets

| PORT ID | ACCESS PORT 1 | ACCESS PORT 2 | ACCESS PORT N |
|---|---|---|---|
| CLIENT IP ADDRESS | XXX | YYY | NNN |
| CLIENT NETWORK CARD MAC ADDRESS | XXX | YYY | NNN |
| SERVER NETWORK CARD ID | XXX | YYY | NNN |
| USER NAME | XXX | YYY | NNN |
| CHARGE TYPE | XXX | YYY | NNN |
| CREDIT CARD NUMBER | XXX | YYY | NNN |
| CREDIT CARD HOLDER NAME | XXX | YYY | NNN |
| CREDIT CARD EXPIRATION | XXX | YYY | NNN |
| PORT STATE | XXX | YYY | NNN |
| ACCESS CARD NO. | XXX | YYY | NNN |
| ⋮ | ⋮ | ⋮ | ⋮ |

COMMUNICATIONS NETWORK CONNECTION SYSTEM AND METHOD

This application is a division of application No. 08/919,397, filed Aug. 28, 1997, now U.S. Pat. No. 5,897,430.

FIELD OF THE INVENTION

The present invention relates to a system and method for remotely establishing an electronic communications link between an electronic communications network, such as the Internet or a wide area network, and a communications device, such as a portable computing device.

BACKGROUND OF THE INVENTION

Electronic communications networks are widely known and accessed. Among such networks are the Internet, on-line services, e-mail services and wide area networks.

It is known to provide access to such electronic communications networks by various means. One common means is via an Internet service provider ("ISP"), who provides access to the Internet for individual users. Examples of ISPs include, Netcom, UUNet and Erols. The Internet generally includes numerous computers that communicate with each other using common communication protocols, commonly known as packet transfer protocols, such as the TCPIP protocol. The ISP system, in turn is connected to the Internet, typically via a high speed communications line to an Internet center such as the nearest super computer center forming part of the "backbone" of the Internet.

Another means to provide access to an electronic communications network is via an on-line service provider ("OSP"). OSPs typically maintain private communications networks, and optional links to certain features of the Internet through their private communications networks. OSPs typically provide additional services, such as private information databases, e-mail among members of the particular OSP, transactional services or games. Examples of known OSPs include America Online, Compuserve and Prodigy.

Once the user calls in to an OSP or ISP, an indirect connection to the Internet via the OSP or ISP is achieved. A user can send and receive messages over the Internet. "Messages" as understood in this description may include any form of communication via a communications network, including, by way of example, any form of digital signals, URL requests, HTML transfers, JAVA code, e-mail messages, FIP transfers, voice, music, Telnet links, GOPHER, and so on.

Another form of communications network is a private "intranet" or wide area network ("WAN"). A typical example is a system linking computing devices at various facilities of a corporation. Remote access to such intranets and WANs typically is accomplished using a dial-up connection (discussed in more detail below) in conjunction with specialized communications software such as the Remote Access, Wildcat! or Procomm software packages.

Dial-up connections are a typical means of connecting into communications networks. In a typical dial-up connection, the user's computer is equipped with a modem, which dials a telephone number for the network. Dial-up connections are commonly used to access ISP and OSP networks. They are also commonly used for remote access to other forms of communications networks, including intranets and WANs, as discussed above. In the ISP example, once a "handshake" is completed between the user modem and the ISP modem, a connection is accomplished and communications access is provided. Such dial-up connections suffer the disadvantage of relying upon the telephone lines to accomplish a connection—depending on the availability of the telephone network, and telephone network dialtone availability. Likewise, the speed of connection is limited by the narrow bandwidth available via typical telephone lines. Such connections also suffer the disadvantage of providing a relatively low speed connection, limited by the speed of available modems. At the current time, typical modems are generally in the 14,400 through 56,000 baud speed range, although it is understood that there are some efforts to develop higher connection rates.

Another form of dial-up connection is accomplished using an ISDN telephone line and a modem adapted for ISDN linkage. Although a faster communications link is achieved than through other forms of modem connection, many of the same disadvantages occur. The connection is relatively slow and the telephone network is used to establish the communication link between the individual user and the communications network. Although a wider bandwidth is provided via ISDN link, the bandwidth is relatively narrow in comparison with that available via direct linkage to a communications network. At the current time, typical ISDN adapted modems achieve maximum connection speed of approximately 128,000 baud.

Modem connections suffer the additional disadvantages of requiring numerous steps to achieve connections for travelers, in hotels, or in public places. In hotels, for example, telephone jacks typically are provided for telephonic connections. Typically, the user must run a telephone wire from the telephone jack provided by the hotel to another telephone jack in a portable computer or personal communicator. The hotel's telephone wiring and switchboard system is then accessed to establish a telephone communications link to the telephone network, which in turn routes a telephone call through to an ISP, OSP or other communications network portal. This suffers numerous disadvantages, including dependence upon the hotel wiring and telecommunications equipment, relatively slow speeds, the use of special dialing codes to obtain an outside telephone connection. Because the hotel room telephone line is occupied, such hotel dial-up users typically cannot make or receive telephone calls while the computer is accessing the telephone lines.

Another form of modem connection available to travelers is via telephone jacks (such as RJ11 jacks) installed in public places, such as telephone booths, or airport clubs—suffering many of the same disadvantages described above regarding telephone jack access in hotels.

Yet another form of electronic communication system access available to travelers is the use of computer communications stations. Various forms of such communications station are generally available in many airports, hotel rooms, ferry terminals, train stations and so on. Several models of such communications stations are available from ATCOM/Info, 308 "G" Street, San Diego, Calif. 92101. Such communications stations can provide access to the Internet, OSPs, or e-mail services. Typically a fee is charged, such as through a credit card and the user can access such electronic communications services as desied. Certain communications stations use direct or T1 links to the Internet, providing relatively wide bandwidth and relatively high speed link. One disadvantage of such communications stations is that only the computing equipment supplied with the communications station can be used to access the electronic communications network—instead of the user's own computer equipment.

T1 links provide another form of connection to a communications network. Although wider bandwidth and higher connection speed than various other known forms of connection can be achieved, T1 links suffer disadvantages of being relatively costly, difficult to install and is not widely accessible using portable communications equipment, such as transportable personal computers and palm computer. Moreover, T1 links are not generally available for mobile users, such as travelers, such as in hotels or public places.

Cable modems are also available for linkage to the Internet via cable television systems. Such cable modems suffer the disadvantages of requiring special access equipment and software and lack of mobility. Moreover, cable modem access to communications networks is not generally available in public places, or for travelers in hotel rooms. Likewise, if it were available for such travelers or in public places, connection is relatively complex, requiring the attachment of cable wiring to the cable system.

Forming local area networks ("LAN") of computers using Ethernet cards, such as a 10BaseT Ethernet card and associated specialized wiring and communications protocols is also known. Many computers, including portable computing systems are equipped with such Ethernet cards. Add-on Ethernet cards are also widely available. Ethernet cards suffer the disadvantage of not providing dial-up connection to electronic communications networks. Moreover, connecting computers using Ethernet cards typically requires secialized network software, such as Novell Netware. Maintaining such networks can be complex, requiring specialized knowledge and skills.

Many computers are equipped with both Ethernet cards and modems. The Ethernet cards are used in such systems for local electronic communication via LAN and the modem is used for dial-up communications to outside electronic communications networks, as described above. This results in numerous disadvantages, such as added equipment expense, increased complexity and increased computer size and weight to accommodate both devices. The latter is a particular disadvantage for mobile or portable computers because the added size and weight renders them less desirable. This is also a disadvantage for travelers as the added weight and size leads to inconvenience in traveling and decreased portability. Moreover, for consumers who prefer smaller electronic devices, increased size impairs the visual quality of the device.

From the above, it is apparent that there is a need for a system and method providing access to electronic communications networks, such as the Internet, for travelers or other people who are away from their normal site of access.

Accordingly it is an object of the present invention to provide a system for accessing electronic communications networks in which equipment required by the user (i.e. the "client equipment" has a decreased size and equipment cost.

It is another object of the present invention is to provide a system and method for high speed access to electronic communications networks.

It is a further object of the present invention to provide a system and method providing remote access to high speed electronic communications networks, particularly for travelers or others who are away from their normal access sites.

Another object of the present invention is to provide access to the Internet, or on-line services, for travelers using their own computers—such as laptops, notebooks and other portable computers.

Yet another object of the present invention is to provide a less complicated system and method for access such electronic communications systems.

A further object of the present invention is to provide controlled network access and to collect payment for access in various locations such as apartment buildings and office buildings.

SUMMARY OF THE INVENTION

The present invention alleviates to a great extent the disadvantages of the known systems and methods for remotely connecting to electronic communication networks by providing a system for connecting a plurality of client systems to a server system via access ports and associated communications linges and providing electronic communications network access for the client systems through the server system. In a preferred embodiment a client system having a personal computer and client connect software connects to the Internet by way of a server running server software. Billing charges are tracked and recorded for each of the client systems by the server software. The server optionally communicates with network management software via an electronic communication network.

The server software tracks and controls access through each of the access ports linked with the server. The server software includes billing features that provide billing options to respective client systems linked with the server, record billing preferences, transmit billing data to approval systems and receive approvals or rejections from the approval systems, transmit approval or rejection signals to the client systems, track system usage by the client systems, monitor log off times and activity times, determine billing amounts and charge respective billing accounts. Client software run on the client systems operates in conjunction with the server software to achieve requisite network connections, provide billing information, activate and conclude log on sessions and so on.

Therefore the present invention provides high-speed Internet access using specialized connection ports. Connections for client systems to an electronic communications network can be metered, allowing billing based on system use. Client systems can be automatically configured for accessing an electronic communications network and billing. In addition, client system configurations are restored following conclusion of a connect session. Various payment options can be selected for use by individual client systems. Moreover, the system software monitors the connections through its access ports to determine if the connection has been lost, in which case the session is terminated and billing can be set accordingly. In addition, the network management software provides for management of the network from a remote location.

In one embodiment, the present invention provides high speed electronic communications system access for travelers in public places, hotel rooms, ships or otherwise away from their normal site of access, by fitting such places with access ports adapted for use with the invention. Multiple users can access a single server, providing increased use of a high speed electronic communications network access line connected to that server. In another embodiment, the invention also provides high speed access to an electronic communications network in multi-room buildings, such as office buildings or apartment buildings where it is desired to have metered access or tolled access.

Using this invention provides users with access to their personal desktop environment provided by their personal desktop computer, as well as access an electronic communications network from a remote location other than that which is normally used for such access.

These and other features and advantages of the present invention will be appreciated from review of the following detailed description of the invention, along with the accompanying figures in which like reference numerals refer to like parts throughout.

DETAILED DESCRIPTION OF THE INVENTION

Figure 1:
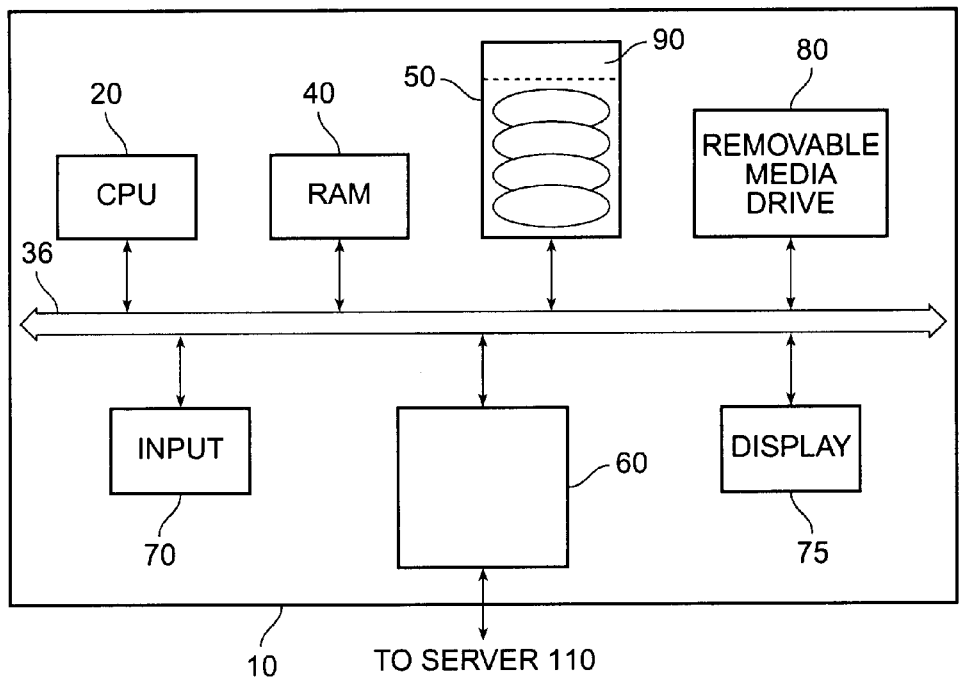
FIG. 1 is a system diagram of a typical client system in accordance with the present invention.

In accordance with the present invention, a system is provided for readily establishing access to an electronic communications network using a mobile or portable client device. In this description, "electronic communications network" will be understood to include any computing, multimedia or video system which a user can remotely access. Examples of such electronic communications networks include the Internet, on-line services, dial up computer servers, wide area networks, e-mail systems and so on. The electronic communications networks in this description preferably are accessed by any means providing the user (or client device) on-line access. Examples include ISPs, OSPs, computer servers, such as those accessed by dial-up access, video database servers, bulletin board services and wide area network servers. It will be understood that an electronic communications network as defined in this description may optionally include a single server computer, such as in a single computer bulletin board system.

"Client device" or "Client system" 10 will be understood in this description to include any device used for access an electronic communications network, typically a data processing system. Such devices may include any type of personal computer, Internet station, television set-top device, palm computers, hand-held computers, or portable computers such as notebook or laptop computers. In addition, such client devices may effectively employ the present invention when utilizing a variety of operating systems or programming languages, such as the "Windows", "Windows 95", "Macintosh", "Windows NT" or "UNIX" operating systems.

As illustrated in FIGS. 1–5, the system and method of the present invention provides a client device 110 with direct high speed access to an electronic communications network 310 ("ECN"), such as the Internet, using specialized access ports 160 placed in public places, which are linked to a server 110, which in turn provides transmission access to the ECN 310. Optionally, the server 110 is also linked via the ECN 310 to a network management server 410. The network management server preferably runs network management software for performing billing transaction processing, remote network management and usage statistical reporting. It should be understood that in one embodiment of the present invention, a plurality of servers 110 are in communication with the network management server in the manner described herein.

Figure 6A:
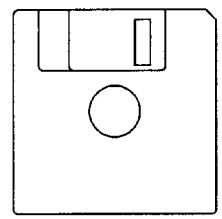
FIG. 6A is an illustration of a transportable floppy disk upon which implementing code is written in accordance with the present invention.
Figure 6B:
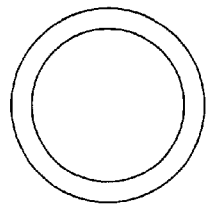
FIG. 6B is an illusration of a transportable magnetic tape upon which implementing code is written in accordance with the present invention.
Figure 6C:
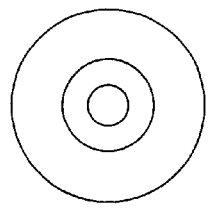
FIG. 6C is an illustration of a transportable optical disk upon which implementing code is written in accordance with the present invention.

As illustrated in FIG. 1 a typical client device 10 includes a central processing unit 20 ("CPU"). The CPU 20 is connected through a bus 30 to, among other things, volatile memory 40 (also called RAM or random access memory), non-volatile memory 50 (such as disk drives, CD-ROMs or data tapes), a network communications adapter 60 (such as an Ethernet card), an input means 70, such as a keyboard and/or a pointing or point-and-click device (such as a mouse, light pen, touch screen, touch pad), an output device, such as a video display screen and/or an audio speaker, and a removable media drive 80, such as a floppy disk drive, CD-ROM drive, PCMIA port, CD-WORM drive or data tape drive. The client system 10 operates client software 90 for use with the present invention. The client software is shown graphically in FIG. 1 as being stored in non-volatile memory 50. However, it should be understood that it can also be stored in transportable media read by removable media drive 80. All, or portions of the client software 90 also can be loaded into volatile memory 40 (RAM), for example during operation. Exemplary transportable media implementing the client software (which may be in any form, such as source code, compiled or binary versions) are illustrated in FIGS. 6A, 6B and 6C as floppy disks, magnetic tape and optical disks, respectively. In the preferred embodiment, a client device is a portable computer and the electronic communications network is the Internet or an on-line service network.

Figure 2:
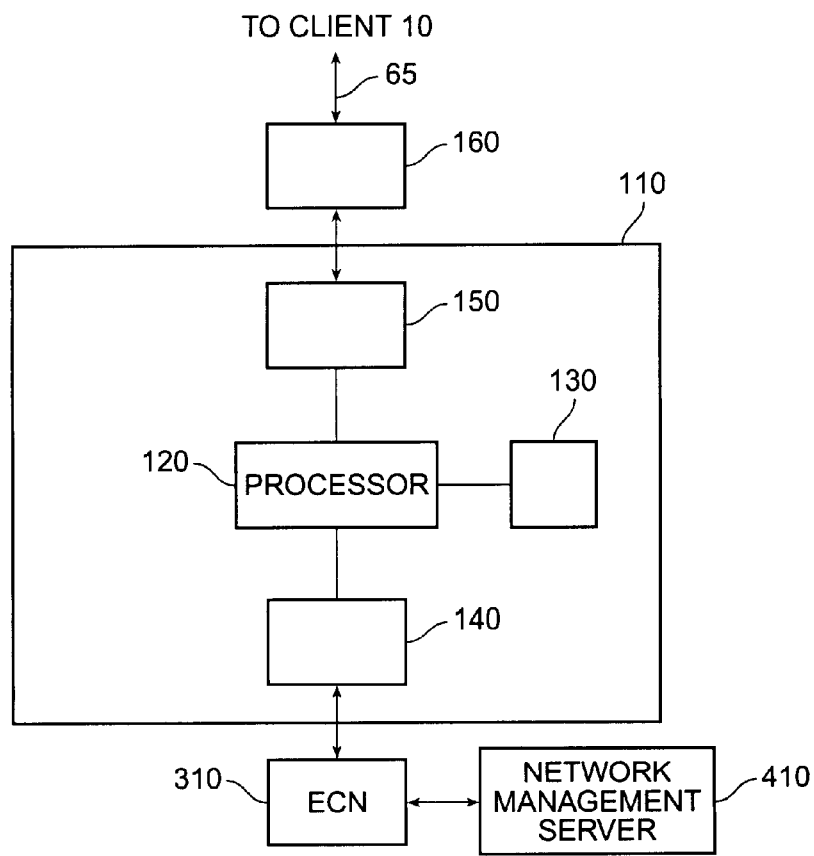
FIG. 2 is a block diagram of a server system in accordance with the present invention.

FIG. 2 is a block diagram showing a server system 110. In operation, the client system 10 connects with an electronic communications network 310 through the server system 110. The server system includes a processor unit 120. In operation, the processor operates various software, including server software 130 adapted for establishing a communications link both with the client system 10 and the electronic communications network 310. Operation of the server software 130 is discussed in more detail below. Generally speaking, once a communications link is established with the client system 10 and electronic communications network 310 ("ECN"), the server 110 acts as in interface between the client system 10 and the electronic communications network 310. In one embodiment, the server 110 includes a communications interface 140 for communication with the ECN 310. This communications interface includes the normal apparatus for such communications, such as for example a T1 transmission line and attendant apparatus. Likewise a second interface 150 is also preferred for communicating with the client system access port 160. The access port 160 preferably is an Ethernet communications port. The second interface 150 receives communications from the access port 160, such as via wire or via wireless transmission. Preferably both the access port 160 and client system 10 are equipped for communications using an Ethernet link, such as using an Ethernet card 60 built in to the client system 10. FIGS. 6A, 6B and 6C also illustrate exemplary transportable media implementing the server software (which may be in any form, such as source code, compiled or binary versions).

The server system 110 preferably communications with the ECN via a high speed communications link, such as a T1, ADSL (Asymmetric Digital Subscriber Line), ISDN and other high speed connection means. The relevant communications interface of the client system 60 and server system 150 provides high speed throughput allowing the client system 10 to receive the benefit of the high speed communications link established by the server 110. Any communications interfaces 60, 150 may be used, although it is preferred that they provide a bandwidth or data throughput comparable to the communications link achieved by the server system 110 with the ECN 310. In alternative embodiments, the communications interfaces 60, 150 provide a slower throughput or narrower bandwidth than that achieved by the link between the server system 110 and the ECN 310.

Any form of access port 160 may be used such that a link can be achieved between the access port 160 and the communications adapter 60 of the client system 110. In the preferred embodiment, the communications adapter 60 is an Ethernet card and the access port 160 is an RJ45 acess jack.

Figure 3A:
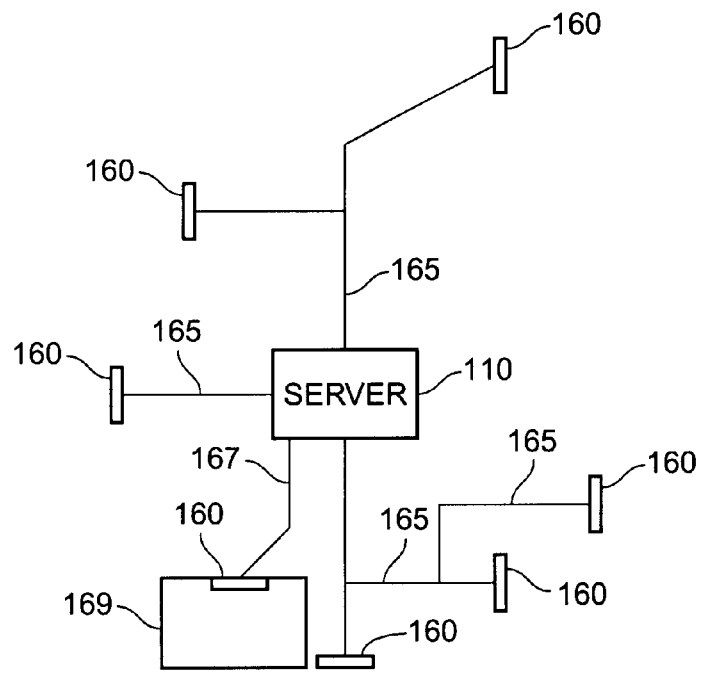
FIG. 3A is a block diagram of a server and access ports in accordance with an embodiment of the present invention.
Figure 3B:
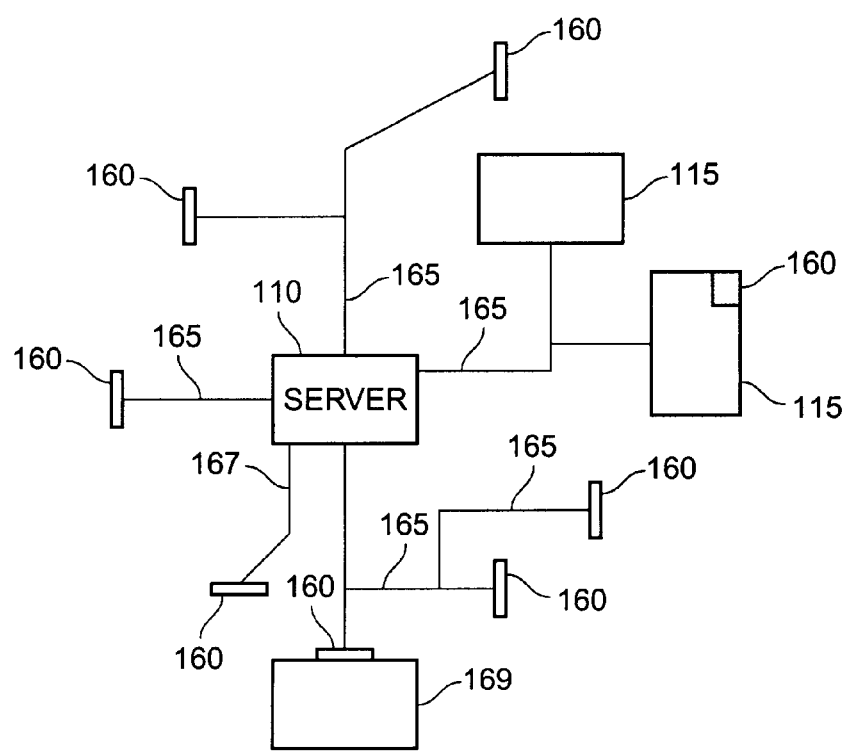
FIG. 3B is a block diagram of an alternative embodiment of the present invention.

Access ports 160 preferably are provided in public places and have a communications link to server 110. By way of illustration, in one embodiment as illustrated in FIG. 3A, a communications station, such as that available from ATCOM/Info, San Diego, Calif., is provided as the server 110, although dedicated servers also may be used. The access ports 160 are distributed and linked via wires 165 to the communications stations, which also serve as server 110 for providing access to the ECN. For example, 10BaseT Ethernet cabling may be used. Alternatively, the access ports 160 are linked via wireless communication (illustrated as lines 167), in which the access port 160 is equipped with a wireless transmitter and the server 110 (more specifically interface 150) is equipped with a wireless receiver. In one embodiment, single UTP with signal converters wireless transmission is used. Optionally, the communications station 110 also includes one or more keyboards and displays, providing local communications network access, in addition to the remote access provided via access ports 160. In one embodiment, the access stations 160 may be placed in pay telephone stations, such as telephone booths 169 . In an alternative embodiment, as illustrated in FIG. 3B, additional communications stations 115 which do not serve as the server 110 can also be linked with the server 110. These communications stations optionally may include an access port 160.

Figure 4A:
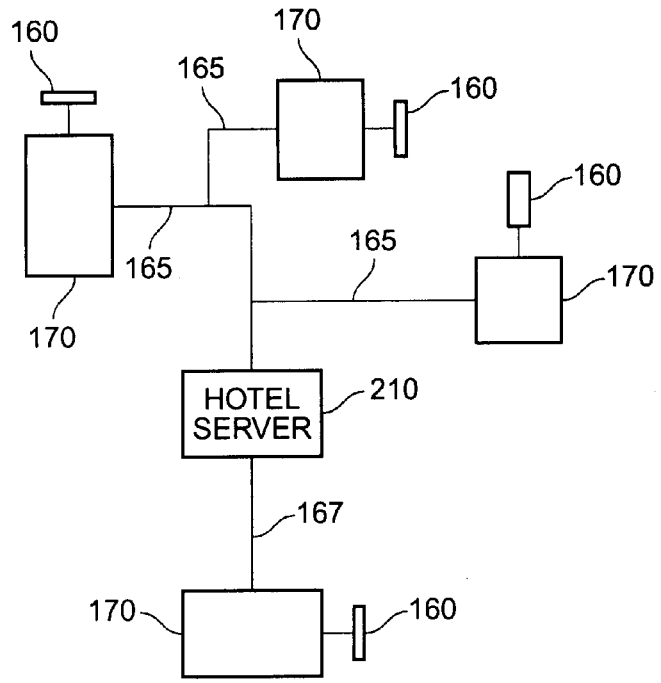
FIG. 4A is a block diagram of a lodging server and access port embodiment of the present invention.

As another illustrative example, as shown in FIG. 4A, the access ports 160 are provided in hotel or motel rooms, in hotels or motels (hereafter collectively referred to as "hotels") equipped with a hotel server 110. These hotel rooms have local terminals 170. Local terminals 170 also may be located in public areas. By way of illustration, hotel servers 110 and local terminals 170 are available from ATCOM/Info, San Diego, California. The local terminals 170 each may include a keyboard, display and CPU (not shown) to provide in-room computing capability. The local terminals 170 are equipped with access ports 160, either within the housing of the local terminal 170 or in a separate housing. The local terminals are linked via wires 165 or wireless communication links 167 with the hotel server 110. Alternatively, this enbodiment may be practiced for other forms of structures such as cruise ships in which tenninals 170 are situated in cabins or staterooms, or even public areas of the ship.

Figure 4B:
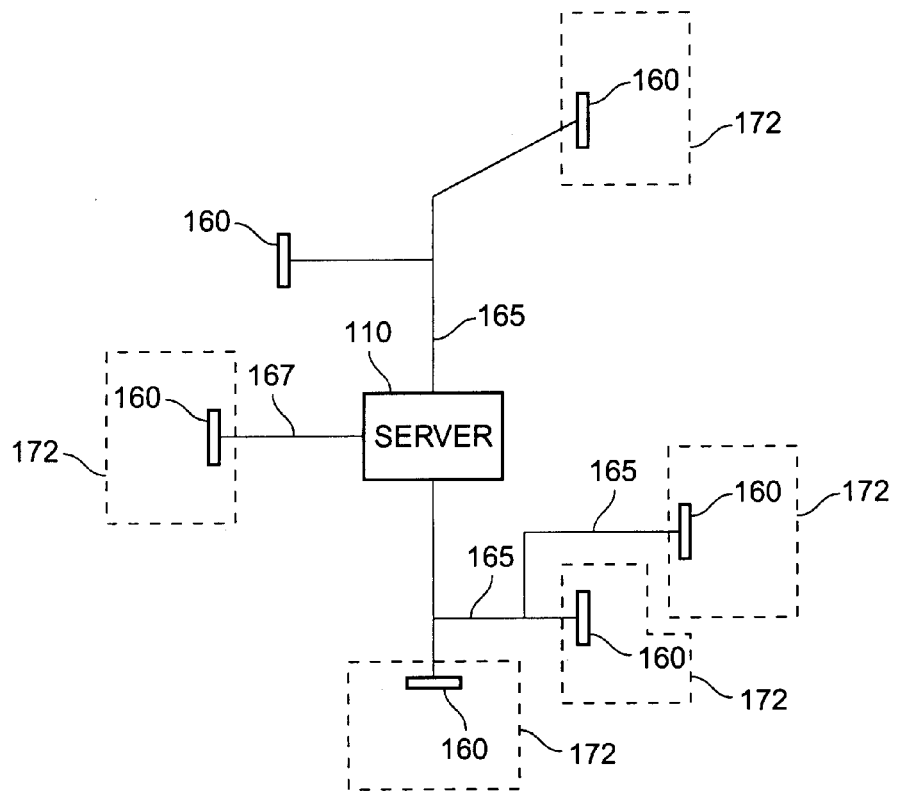
FIG. 4B is a block diagram of a building server and access port embodiment of the present invention.

Another example is illustrated in FIG. 4B, which illustrates a structure such as an office building or apartment building adapted for the present invention. The access ports 160 are provided in individual apartments 172 or offices 172 equipped with a server 110. These apartments or offices have local terminals 170, which may include personal computers, or any other type of computing terminal. The local terminals are connected via cable or wireless link with the access ports 160. For example, the apartments or offices 172 can be wired with access ports in the walls or floors. The local terminals 170 are linked via wires 165 or wireless communication links 167 with the server 110. Any combination of plural office buildings and/or apartment buildings, or other types of locations may share a single server 110.

Figure 5:
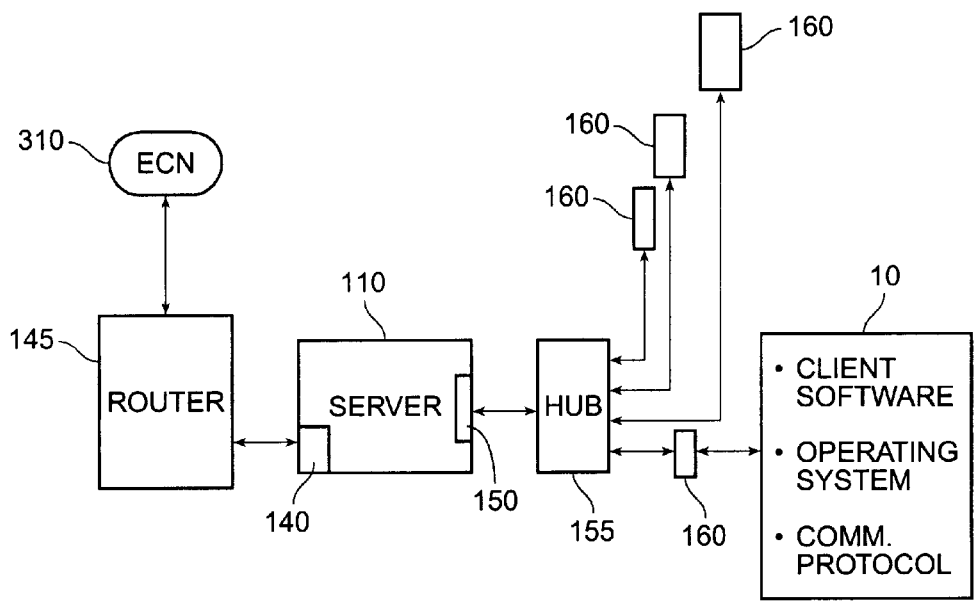
FIG. 5 is a block diagram of a server and access ports in accordance with an embodiment of the present invention.

Another example is illustrated FIG. 5. In this example, the client system 10 is operating client software 90 under an operating system, which may be any operating system such as the WINDOWS 95 operating system, and communicating using a communications protocol, such as the TCP/IP communications protocols. It should be understood that these are for exemplary purposes only and other operating systems or communications protocols may be used. A plurality of access ports 160 are connected to a hub 155 which in turn is linked to server 110, via the interface 150. The access ports 160 may also be connected via a local area network to the server 110. The server 110 is connected to a router 145 via the communications interface 140. The router transmits and receives transmissions to and from the ECN 310.

In operation of the preferred embodiment, a user attaches a cable 65, such as an Ethernet cable from the network communications adapter 60 to the communications port 160. Then the user runs the client software 90 in order to establish a communications link through the communications port 160 and server system 110 to the ECN.

The client software 90 may be loaded on the client system 10 by any means which will allow the client software to be operated on the client system 10. For example, the client software 90 may be downloaded from an Internet site. Alternatively, it may be supplied via the transportable media illustrated in FIGS. 6A, 6B or 6C, or it may be loaded on the client system 10 via direct link such as via a serial port. Alternatively, the client software 90 may be incorporated into the operating system software—in which case it would be loaded on the client system 10 along with the operating system software.

Figure 7:
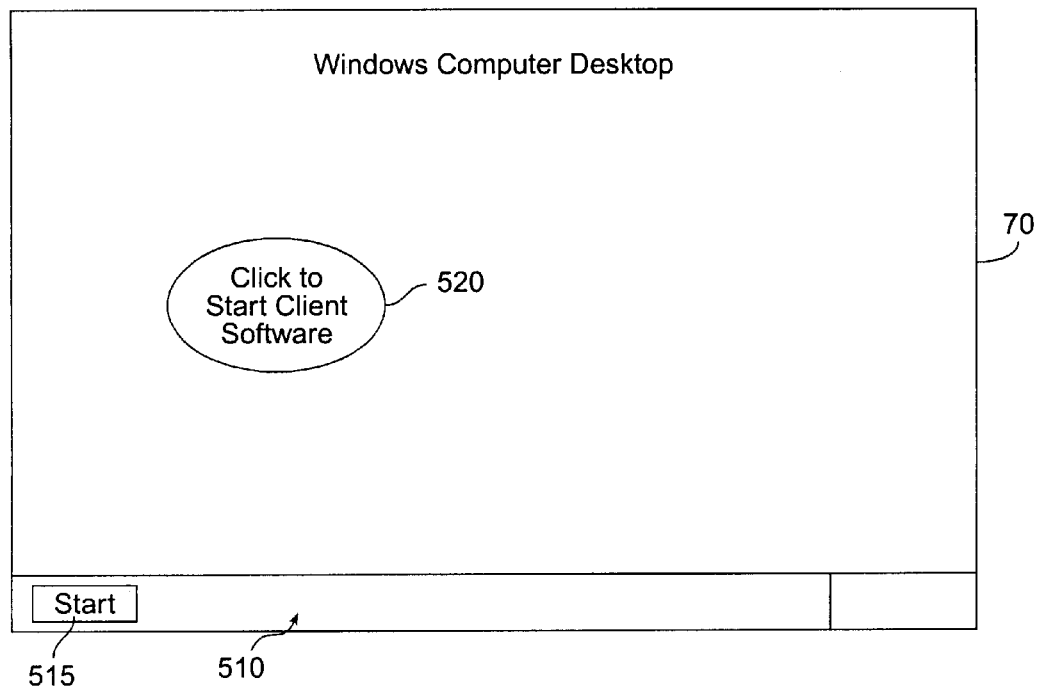
FIG. 7 is a display screen representation showing a display screen of a client system in accordance with an embodiment of the present invention.

Once the client software 90 is installed on the client system 10, it may be executed by any method. For example, it can be run using the input device 70 to select the client software 90, such as by selecting it from a menu—such as a "Start" menu under the WINDOWS 95 operating system. Alternatively, it can be run by clicking on an icon linked with an executable file. FIG. 7 illustrates operation under a WINDOWS 95 type of desktop. The WINDOWS taskbar 510 is shown at the bottom of the display screen 75. "Start" button 515 is shown at the right side of the taskbar 510. Optionally, the client software 90 may be selected for execution by clicking using an input device 70 on the start button 515 to reveal the Start Menu, which preferably includes an option (not shown) for selecting the client software 90. Alternatively, the client software may be executed by using the "Run" option (not shown) on the Start Menu. In the illustrated embodiment, an icon 520 is provided corresponding to the client software 90. The client software is started by using the input device 70 to designate the client software icon 520, such as by pointing and clicking.

Figure 8:
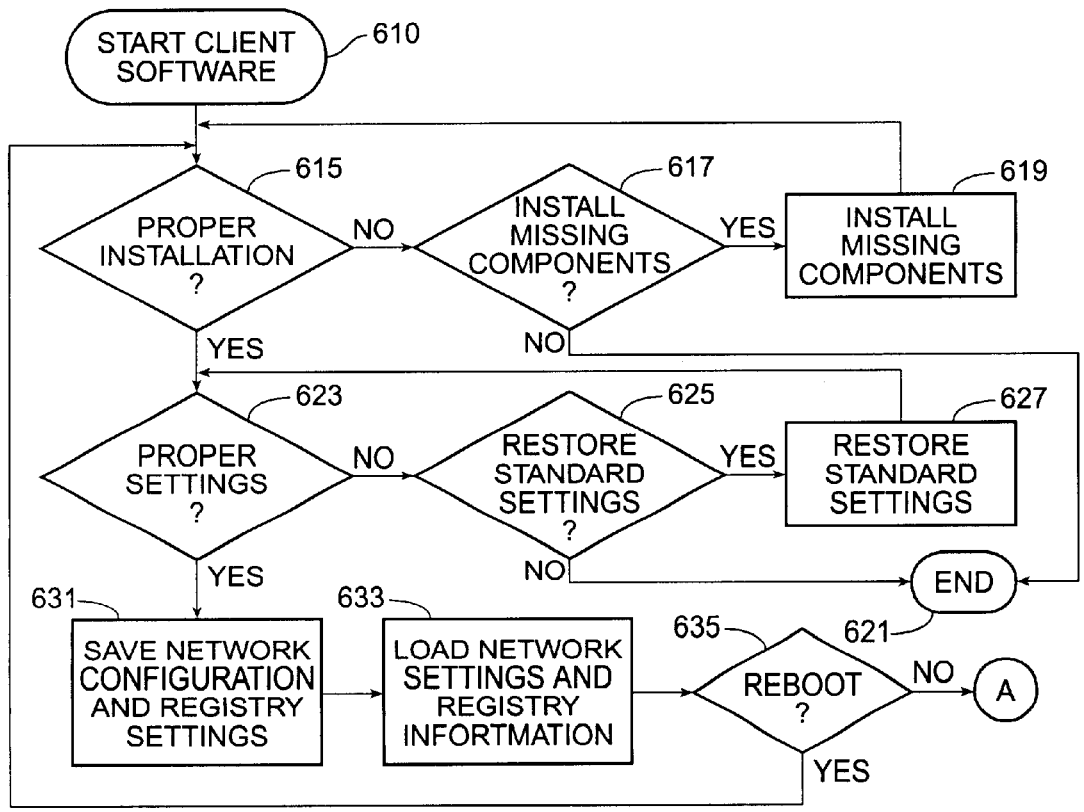
FIG. 8 is a flow diagram of operation of client software in accordance with the present invention.

Operation of a preferred embodiment of the client software 90 is illustrated by flow diagram in FIG. 8. The client software 90 is started in step 610, such as in the ways described above. Optionally after start up, in the next steps, 615 and 623, the installation and settings are checked. In the installation check in step 615, the client software 90 first checks the installation on the client system 10 for the components of the client software 90 required for operation and offers to install the missing software components in processing step 617. If the answer given is "yes", the next step 619 is to install the necessary missing components. These missing components may be installed by any means. For example if install files are loaded already on the client system 10, for example in non-volatile memory 50, those install files may be accessed. Alternatively, installation media (such as floppy disks, CD-ROM etc.) may be requested. In another example, the system may access an Internet web site or FTP site to download the required components.

In the preferred embodiment, the server software 130 sends the necessary missing components to the client system 10 in connection with step 617, which in turn installs them. In addition, in this way, the client software 90 also may be updated with new software versions, such as enhanced or updated versions, as well. For example, the server system 130 maintains the most current versions of the client software, for example in its non-volatile memory, or in a known remote FTP site. When a client system 10 connects, using the procedure described herein, any updated components of the client software 90 as well as any missing components are sent to it. In this way, users can be kept current with client software enhancements.

Once the components are installed, processing returns to step 615 where installation is verified. Alternatively, if "no" is selected in step 617, processing may either continue, if possible (not shown) or the client software 90 operation may be terminated; this is indicated by the End box numbered 621 in FIG. 8.

Processing continues with step 623, in which various settings may be checked, such as network configuration and registry settings. Such network configuration and registry settings include such items as the IP address, gateway address, DNS address, network logon preferences, file sharing settings, browsing control settings and other settings related to configuring a secure network connection. For example, this step may optionally check to determine if a previous session using the client software 90 was completed successfully or if the client software did not restore the client system network settings. It is desired to restore the client system network settings at the conclusion of a session in order to restore the client system 90 to its standard settings status, such as those that are necessary for its normal place of ECN access. If such settings were not correctly set, the user is offered the option of restoring standard settings, such as standard network settings. This processing step is indicated in the flow diagram box 625. If "yes" is selected, the settings are restored, as illustrated in step 627, after which processing returns to step 623. Alternatively, if "no" is selected in step 625, procesing may either continue, if possible (not shown), or the client software 90 operation may be terminated, as indicated by the End box 621.

Once proper settings are set, optionally, the settings may be saved to disk, such as to non-volatile memory 50, as indicated in step 631. It should be noted that this step 631 can be performed at any time, or not at all.

Operation of the client software 10 then continues with the step indicated by box 633 in FIG. 8. The network configuration and registry settings are accessed. Preferably, the network settings and registry information are loaded into RAM memory 40. This information is required in a typical embodiment for access to the server 110. In step 635, the system software 90 then reboots the client system 10 if required. For example, rebooting may be desirable because in certin situations, changing network settings requires rebooting. If the system reboots, then processing continues again at some point in the previously described steps; for example, processing may continue with step 615, as illustrated in FIG. 8, or at other steps as desired, such as at step 623 or 635. If the system does not reboot, operation of client software 10 continues, as illustrated in FIG. 9 (designated by continuation character "A").

Figure 9:
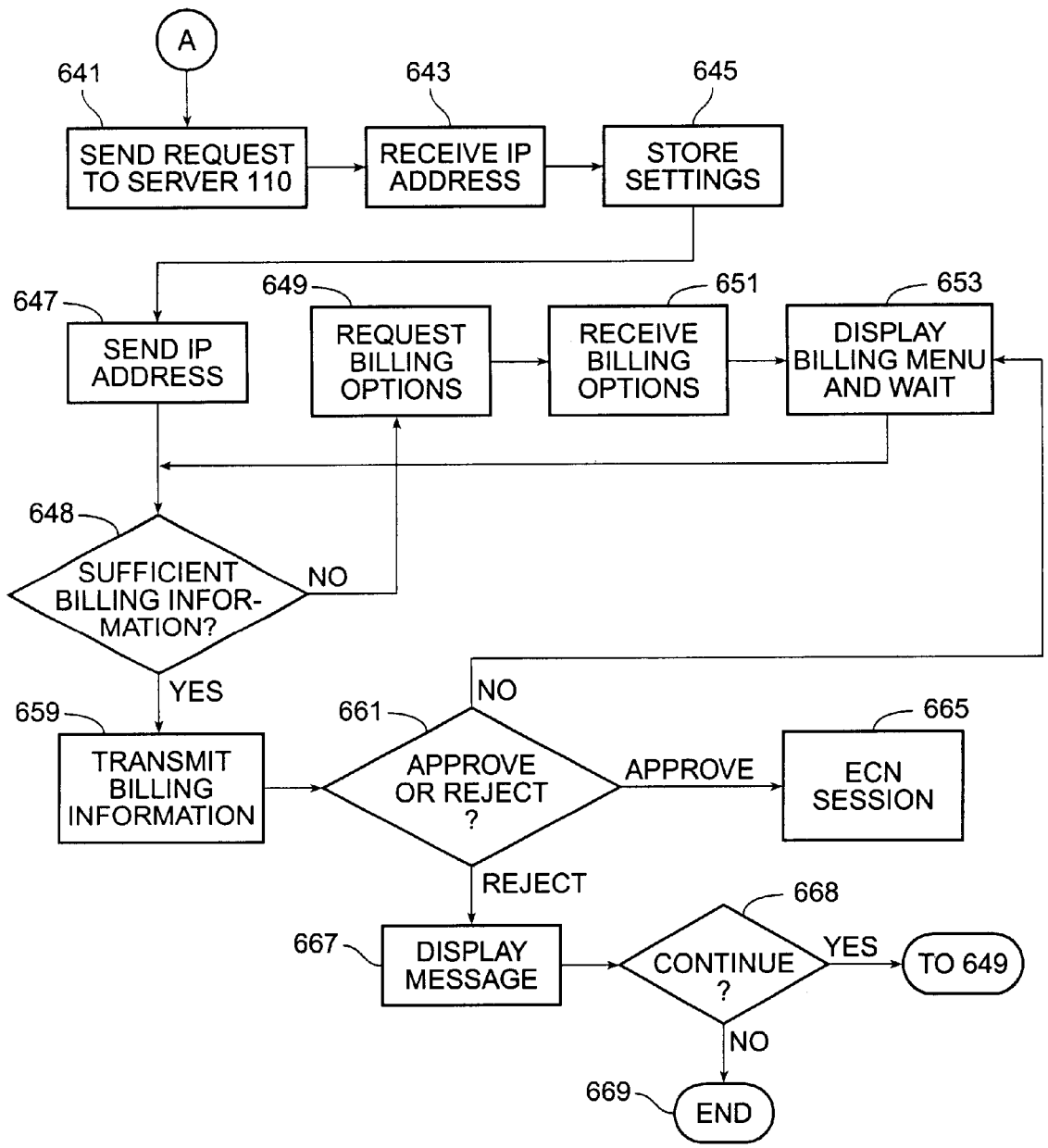
FIG. 9 is a flow diagram of operation of client software in accordance with the present invention.

The client software 10 then begins the process of connecting to the server 110, with step 641, as illustrated in FIG. 9, in which the client software 10 sends a request for necessary information to the server 110 via the access port 160 and communications systems described above. For example, the request may be sent from CPU 20 through bus 30 to network communications adapter 60, then through a wire connecting the network communications adapter 60 to access port 160. Then the request may go either through cabling 165 or wireless link 167 to the server 110, via interface 150 in the server. In particular, the information requested preferably includes dynamic assignment of an IP address for the local area network of which the access port 160 is a part. An IP address generally is a unique address for identifying the client system in a network context. The IP address assignment is received from the server in step 643 and preferably is stored in memory (any of RAM memory 40, non-volatile memory 50 and/or removable media) in the next step, illustrated by box 645. The IP address assigned also may be reported by the client software to server access control software, operating on the server 110. This option is illustrated as step 647 in FIG. 9. This is desirable in order to identify the particular client system 10 to the server 110 when more than one client system 10 is accessing the server 110 at any one time, or when more than one access port 160 is available for use.

In the preferred embodiment, the user of the client system 10 is billed for access to the ECN 310. Examples of billing techniques are time-based billing and operation-based billing. Preferably, the client software 90 implements a set-up procedure in which billing information, such as credit card information is pre-stored in memory. In one embodiment, the user answers questions eliciting pertinent billing or credit card information during a set up process. Alternatively, the client system may include some kind of credit card reader (not shown), which can read credit card information from the user's credit card, such as from an encoded magnetic stripe on the credit card. In another alternative, a smart card, having an encoded computer chip may be used in conjunction with a smart card reader (not shown) installed on client system 10.

In the next step, the client software determines if billing information has been pre-stored in memory. Preferably the user has pre-stored such billing information, such as during the set-up process and this information is read from memory. The software 90 checks for stored billing information. If there is prestored billing information, "yes" is returned in step 648. If there is no pre-stored billing information, processing proceeds to a series of billing information requests (steps 649–653) in which billing information is requested from the user. In an alternative embodiment, billing is not required and processing proceeds to step 655.

In the illustrated embodiment, if "no" is returned in step 648, billing options can be requested from the server 110. This is shown by flow diagram box 649. Alternatively, the server software 130 may be set to automatically send, or "push" the billing options to the client software 90, or the client software 90 may have pre-stored billing options, or the client software may have pre-stored billing options which may be supplemented by information from the server 110. In a preferred embodiment, the server 110 runs a form of billing software, which provides this information to the client software 90 via the connections described in this specification. These billing options may include, for example, credit cards, prepaid access cards, smart cards or direct charges to a hotel room bill. In the illustrated embodiment, after the billing options are received, step 651, a billing options menu or series of menus may be displayed 653. In one embodiment, a credit card information template is displayed and filled out by the user of the client system 10. Once billing information has been satisfactorily entered, processing continues. For example, as illustrated, processing may return to step 648. Once sufficient billing information is received, stored or entered, the billing information is transmitted to the server 110, preferably to the billing software running on the server 110. Such billing software optionally is a separate software module from the server software 130, but preferably is part of the server software 130. This step is illustrated by box number 659. Preferably this billing information is stored on the server 110 for later access and bill processing reporting.

Once the billing information is completed and transmitted in step 659, the server software 110 or billing software components either approve or disapprove the billing information. The client software 90 waits for approval or rejection as illustrated in step 661. Optionally, this approval process may be accomplished by transmitting information via ECN communication with a billing processing center. If billing is rejected (i.e. denied), in the illustrated embodiment, a message is displayed on the display 75 providing the user with an option of selecting a different billing method or providing additional billing information, or of terminating the session. This is indicated by box 667. The user's decision is processed as indicated in box 668. If the user decides to continue, by selecting a different billing method or providing additional billing information, processing may return for example to step 649 (request billing options) or step 653 (display billing menu). Alternatively, the session may be ended if the user decides not to proceed, as indicated by "no".

An approval or rejection signal is transmitted by the server software 130 to the client software 90, as indicted in step 661. If billing is approved, the server software 130 grants access to the ECN 310 for the client system 10 by enabling routing for the specific IP address assigned to the client system 10. In the embodiment illustrated in FIG. 5, approval is received by the client software 90, and the server software 130 grants access to the Internet 310 (one type of ECN) by routing the user's IP address from the server 110 to the ECN via the interface 140 and router 145.

The ECN access session is represented in FIG. 9 by diagram box 665. In a preferred embodiment, the user is given the connected to the Internet, as discussed above. Alternatively, the user may be connected to another form of ECN. For example, the user may be connection to an on-line service. Alternatively, the user may be given an option of having a telephonic communications session activated, such as by accessing a dial-up server, such as a dial-up server providing wide area network, database or bulletin board system access.

Figure 10:
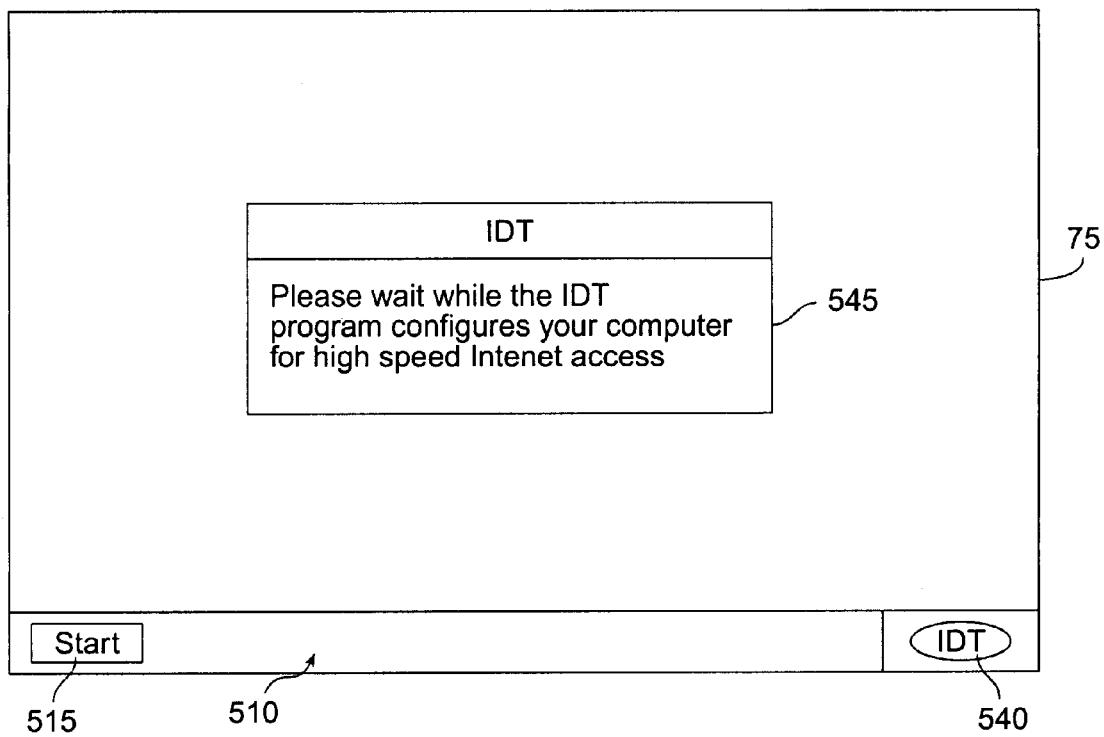
FIG. 10 is a display screen representation showing a configuration screen of a client system in accordance with an embodiment of the present invention.

An exemplary display screen appearance while the client software 90 is loading and establishing the link with the ECN 310 is shown in FIG. 10, while operating under a WINDOWS 95 type of desktop 75. The WINDOWS taskbar 510 and "Start" button are shown at the bottom of the sceen 75. An active icon 540 for the client software 90 is show at the bottom left of screen 75. Although the name "IDT" is shown for the client software 90, any name or symbol may be used. An activity box 545 is displayed in the screen 75. In the preferred embodiment, such an activity box 545 is displayed in order to indicate that the system is establishing a connection. In the example shown, the activity box 545 informs that the client system 10 (the "computer") is being configured for access to the ECN 310 ("high speed Internet access").

Figure 11:
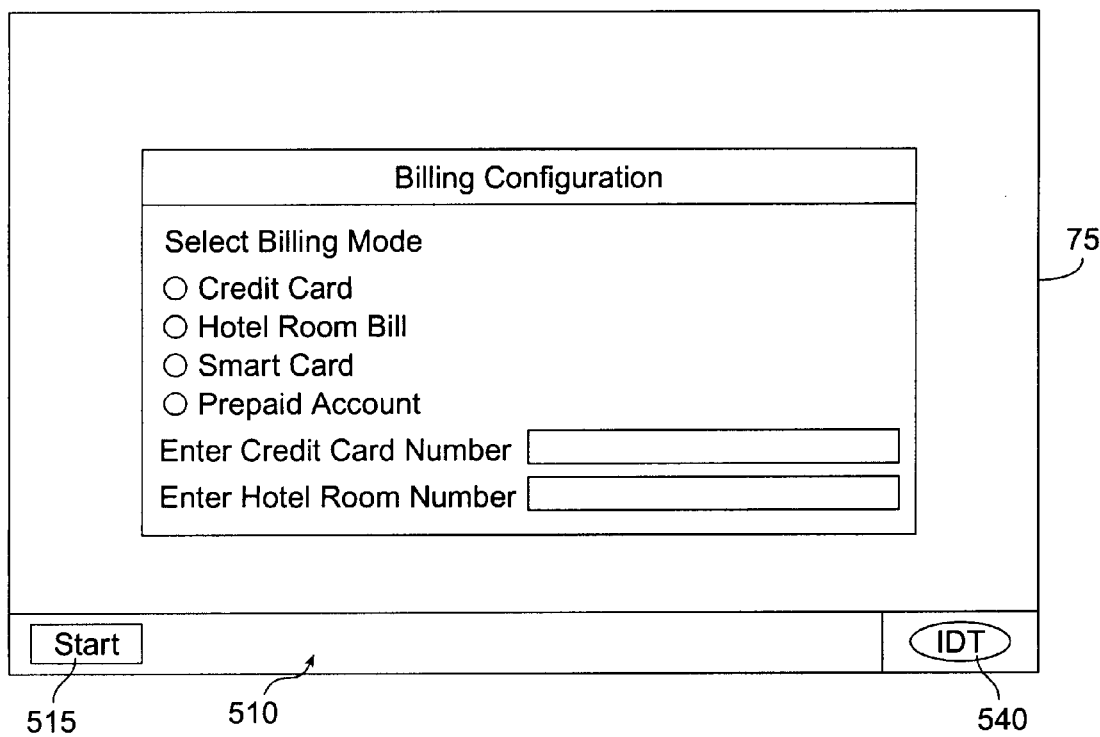
FIG. 11 is a display screen representation showing a billing menu screen of a client system in accordance with an embodiment of the present invention.

An exemplary display screen appearance for the billing options is illustrated in FIG. 11. This is an illustration of the menu that can be displayed in step 653, illustrated in FIG. 9. Various billing options are provided and the user is requested to "Select Billing Mode". Any form of menu or selection screen may be used and any number or variety of billing options may be offered. In the illustrated embodiment, the user is given the choices of billing through credit card, smart card, hotel room bill or a prepaid account.

Other options that can be offered, by way of example, include debit card billing, pre-paid access card, Internet banking or electronic checking. Dialog boxes are also provided for entering a credit card number or a hotel room number. Additional dialog boxes or other arrangements of dialog boxes may also be provided. For example, dialog boxes for credit card expiration, credit card name or pre-paid access card number may also be provided. Multiple billing screens also may optionally be provided. For example, in one embodiment, a first screen offers billing mode selection. After a selection is designated, the client software displays another screen (or none at all), depending on the billing mode selection. For example, if credit card payment is selected, the next screen may provide a form prompting the requisite information, such as credit card number and expiration date. Alternatively, the client software 90 may have pre-stored billing information, such as credit card or prepaid account information. In this alternative embodiment, after billing mode selection the client software 90 checks for pre-stored information corresponding to that billing mode. If there is such prestored information for the selected billing mode, the client software 90 then loads that information. If there is no such pre-stored information for the selected billing mode, the client software 90 then displays a corresponding information entry screen (such as a form) for the entry of pertinent billing information. In an alternative embodiment, these billing queries, menus etc. may be generated by the server software 130 and transmitted to the client system 10.

Figure 12:
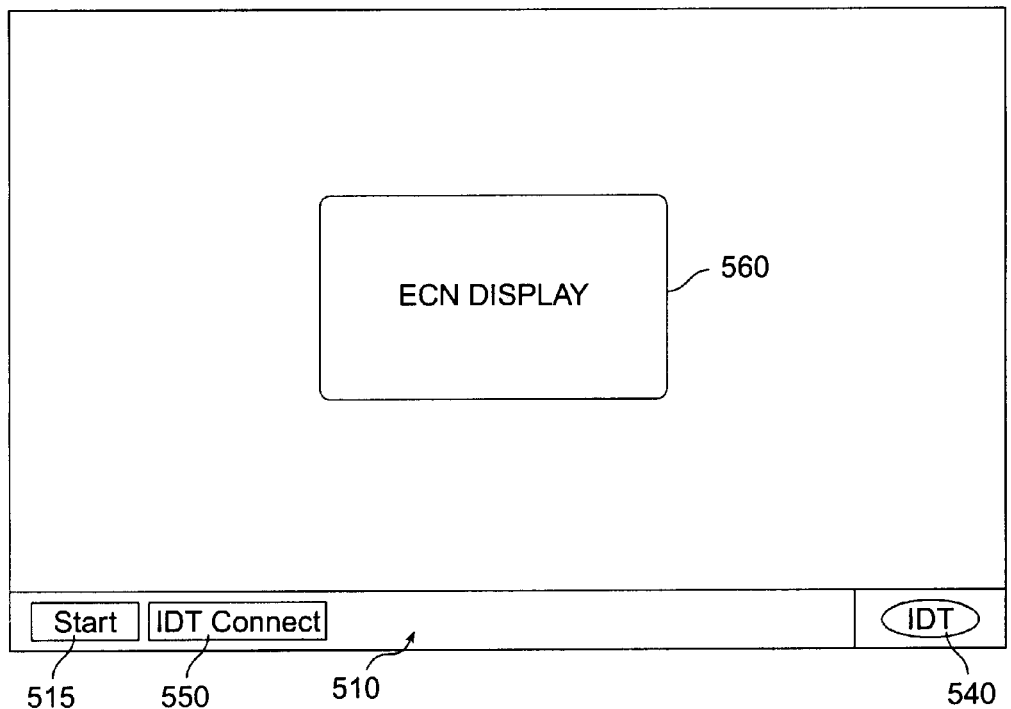
FIG. 12 is a display screen representation showing a session display of a client system in accordance with an embodiment of the present invention.

FIG. 12 illustrates an exemplary display screen appearance after an ECN connection is accomplished—for client software 90 operating under a WINDOWS 95 type of operating system. This is an example of a display screen appearance corresponding to step 665, illustrated in FIG. 9. The windows taskbar 510 includes an active icon 540 for the client software 90 and a minimized button 550 for the client software 90. The minimized button 550 can by selected by using the input device 70, such as by pointing and clicking using a mouse, touch pad or touch screen. A selection screen for the client software 90 is displayed if the minimized button 550 is so selected. The selection screen may include various options, such as set up configuration or ending the session. Any ECN display 560 may appear on the screen during a session. For example, a web page may be displayed, or an on-line service may be displayed, e-mail may be displayed, an FTP menu may be displayed, and so on.

Figure 13:
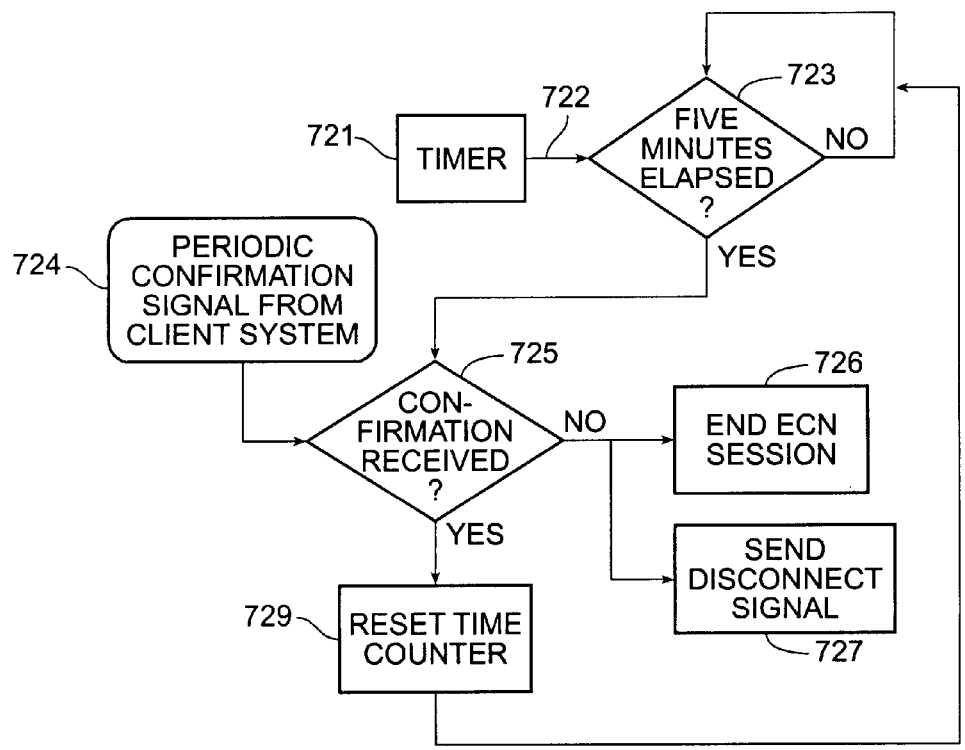
FIG. 13 is a flow diagram associated with a server system in accordance with the present invention.

Various processing steps can be undertaken by the client software 90 and server software 130 during an ECN session. For example, it is preferred that the client software 90 periodically signal the server software 130 to confirm the continuation of an ECN session. By way of illustration only, the client software 90 may send a control signal to the server software 130 every five minutes, indicating an active ECN session. The timing loop processing steps undertaken by the server software 130 are illustrated in FIG. 13. As seen in FIG. 13, the server software 130 includes a timer 721 which provides a clock signal. In the timing loop illustrated the clock signal 722 is received and a determination is made as to whether the wait period, in this case five minutes, has elapsed since the preceding periodic confirmation signal 724 received from the client software 90 of the client system 10. Once the wait period has elapsed, the server software 130 determines whether a periodic confirmation signal 724 had been received. If not, the server software 130 ends the ECN session, as indicated by process step 726. In ending the ECN session, the server software 130 releases the IP address assigned to the particular client system 10. This is the case in any instance in which the client system software 90 does not maintain the connection to the server 130. Optionally, if a "no" signal results in step 725, the server software sends a disconnect signal to the access port 160 to which the client system 10 was connected, as indicated by process step 727. If the client system 10 is still connected to the access port 160, its client software 90 receives the disconnect signal and undergoes a disconnect sequence. It is understood that the physical connection of the client system 10 with the access port 160 may be disconnected without the client software undergoing a disconnect sequence (which is discussed in more detail below). For example, the user may disconnect the link, e.g., the cable, between the access port 160 and the client system 10 without commencing a disconnect sequence. Alternatively, the connection between the client system 10 and the server 110 may otherwise have become interfered with prior to a disconnect sequence by the client software 90.

Alternatively, the server software 130 may periodically signal the client software 90 to confirm the continuation of an ECN session. By way of example, the server software 130 may send a control signal to the client software 90 every five minutes, indicating an active ECN session. As another example, the server software may periodically send a polling signal to each of the client systems 10 logged on at any given time. This periodic polling signal requests a return confirmation signal from each respective client system 10. Upon receiving the polling signal from the server software, the client software 90 of the client system 10 returns a cofirmation signal. If a confirmation signal is not returned, the server software 130 ends the ECN session for the particular client system 10, and optionally sends a disconnect code to the access port 160 corresponding to the particular client system 10. If the client system 10 is still connected to the access port, it receives the disconnect code and the client system software 90 undergoes a disconnect sequence.

Figure 14:
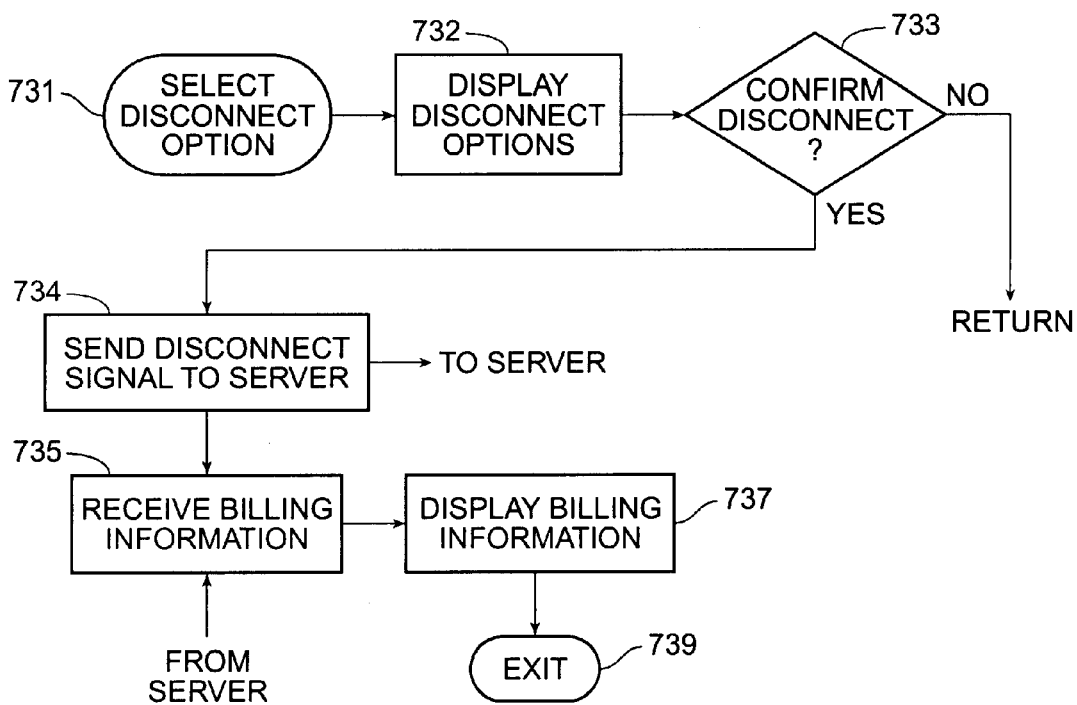
FIG. 14 a flow diagram associated with another aspect of a server system in accordance with the present invention.

In the case where there is a failed connection, such as when a periodic confirmation is not received, as when a "no" is returned in step 725, or the connection between the server 110 and client system 10 is otherwise discontinued without the client software undergoing the disconnect sequence (as illustrated in FIG. 14 and described below), the server software preferably calculates billing charges and sends the billing information to the pertinent billing agency or processing station, via the ECN 310.

Figure 15:
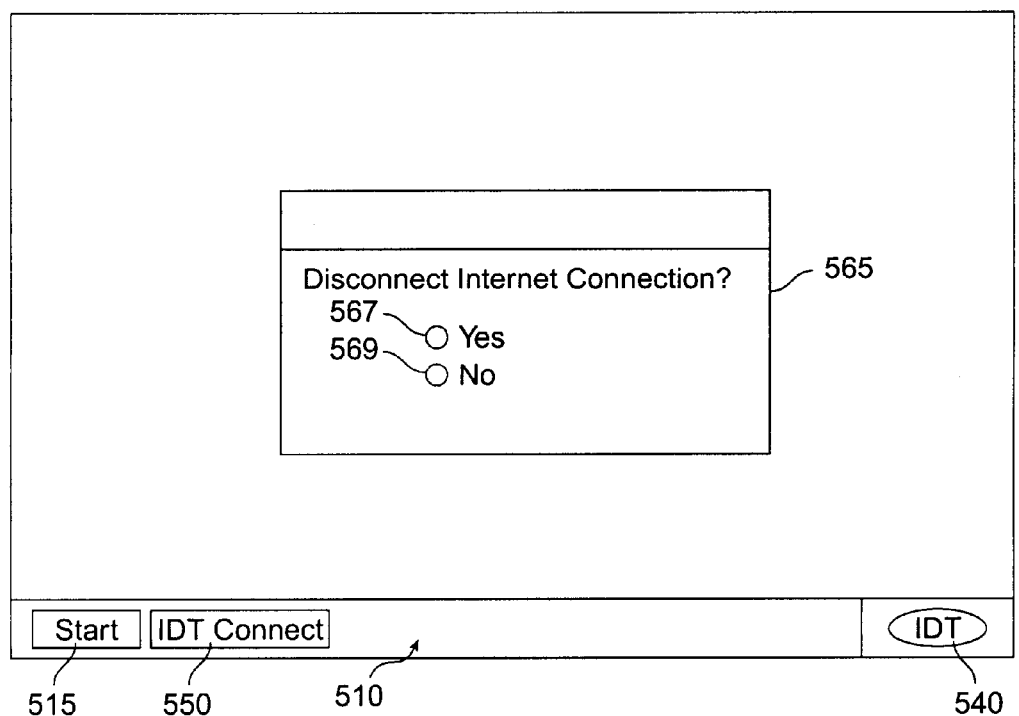
FIG. 15 is a display screen representation showing a disconnect display of a client system in accordance with an embodiment of the present invention.

A disconnect sequence for the client software 90 is illustrated in FIG. 14. In operation, at any time during operation of the client software, such as during an ECN session (indicated by box 665 in FIG. 9), or preferably at any other time as well, a user of the client software 90 may commence a disconnect sequence. Preferably this is done by using an input device 70, such as a point and click device, to point on a disconnect button (this may say, for example, "end session now" or "sign off" or "stop"). Such a disconnect request is indicted by box 731 in FIG. 14. Preferably the client software 90 then displays a disconnect option screen 565 for the user to confirm disconnect, in step 732. An exemplary disconnect option screen 565 is illustrated in FIG. 15. This exemplary screen includes a choice selection, namely for the user to confirm the disconnect selection 567 or to disclaim the disconnect choice 569 and remain connected and return to other operations of the client software, such as returning to the ECN session. In the illustrated example, the user is give the choice of selecting "Yes" 567 to disconnect, or "No" 569 to remain connected. Preferably a point and click device issued to indicate the selection 567, 569. In operation of the client software 90, if option 567 is selected, i.e., confirming disconnect, then "yes" is returned in step 733 illustrated in FIG. 14. If confirmation of disconnection is not received, by selection of option 569, "no" is returned in step 733.

If "yes" is returned in step 733, the client software sends a disconnect signal to the server software 130 requesting termination of the ECN session, as indicated in step 734 If "no" is returned in step 733, the client software returns to other activities, such as a log in sequence or an ECN session. The disconnect signal is received in the billing processing portion of the server software 130, which is discussed in more detail below. The server software 130 reports the billing information to the client system software 90, as indicated in process step 735, where the billing information is received. In the next step 737, the client software displays billing information, based on the data received from the server software 130 in step 735.

Figure 16:
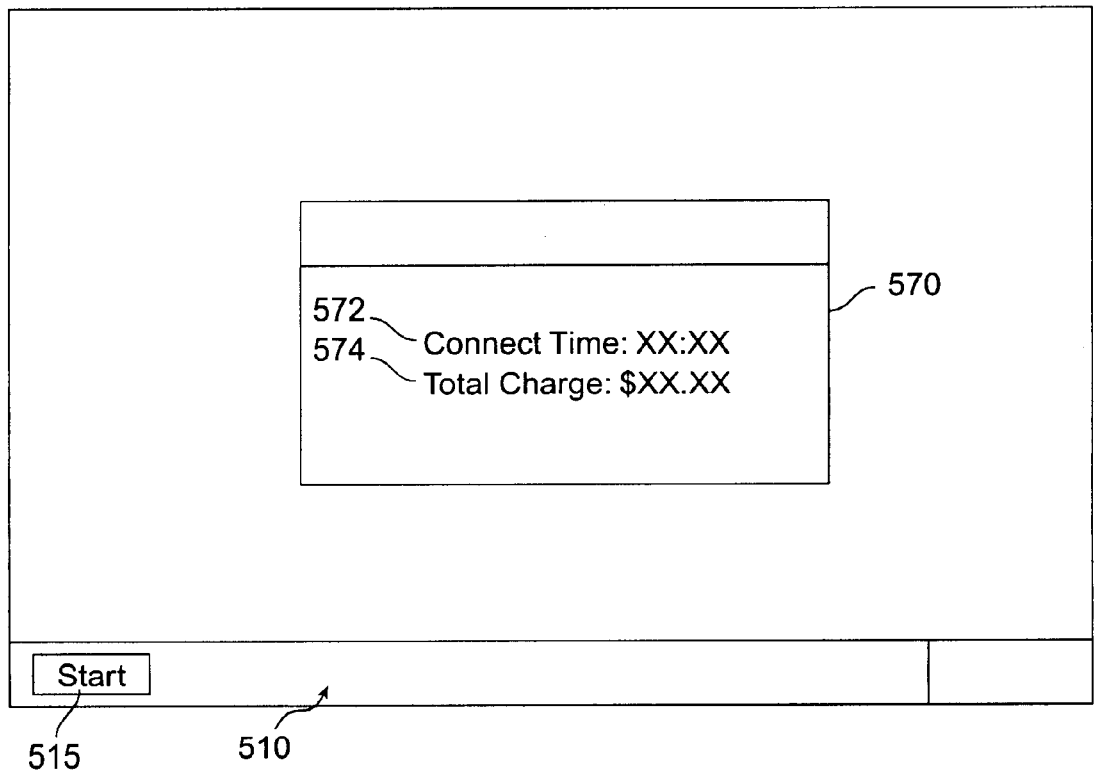
FIG. 16 is a display screen representation showing a billing display of a client system in accordance with an embodiment of the present invention.

An exemplary billing display screen 570, such as may be displayed in conjunction with step 737, is illustrated in FIG. 16. Any data may be displayed in this screen. In the example shown, be connect time 572 and total billing charge 574 are displayed. Any other data may be displayed as well. For example data indicating services accessed, premium charges, hotel room charges or incidental charges may optionally be displayed. The billing display screen 570 may also be used in conjunction with or be replaced by other types of display screens. For example a "Good-bye" screen or "Log-off" screen may be displayed. Other messages or textual material also may be displayed, such as information regarding various service offered may be displayed, either in conjunction with the billing screen, or in previous or subsequent screens. Such other screens or messages may be displayed in conjunction with the Exit step 739 illustrated in FIG. 15.

In the Exit step 739, the operation of the client software 90 is ended. Optionally prior to the Exit step 739 various processing steps may be taken in conjunction with ending the operation of the client software 90. In the preferred embodiment, settings data may be stored to non-volatile memory 50. For example, the saved initial network settings stored in step 631 may be restored. Likewise, the computer may be rebooted if required. Upon completion of this exit sequence, the execution of the client software 90 preferably is ended. In conjunction with the Exit step 739, the active icon 540 and minimized icon 550 are no longer displayed on the taskbar 510.

The server software 310 performs various functions, in communicating with various client systems 10 through the access ports 160, controlling billing functions, maintaining a client usage database, monitoring access ports 160, transmitting messages to the ECN 310, interacting with remote billing systems or a remote network management system 410. Some functions of the server software 310 have already been discussed, and additional functions will now be outlined. The server software 310 functions to communicate with the client systems 10 and client system software 130 in order to initiate an ECN session between the respective client system 10 and the ECN 310. It should be understood that the server software 310 may be in communication with a plurality of client systems 10 each running client software 130 at any one time. Alternatively, a single client system 10 may be communicating with he server software 310, or none at all. The server software also serves a variety of functions for managing the operation of the server 110, such as initialization sequences, testing ports, and so on.

Figure 17:
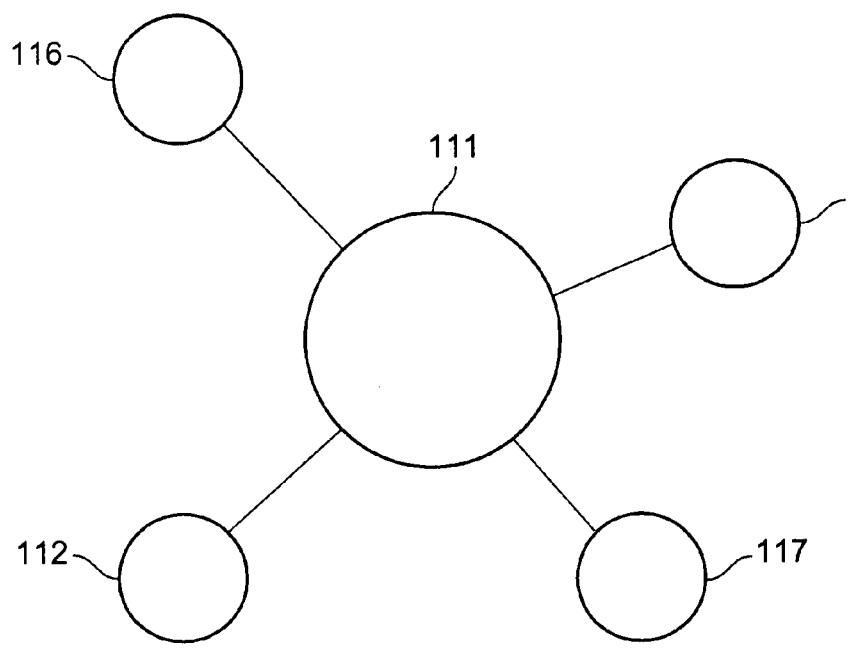
FIG. 17 is a symbolic representation of modules of server software in accordance with an embodiment of the present invention.

In one embodiment, the server software 110 may conssst of a plurality of cooperating modules or objects. A graphical depiction is illustrated in FIG. 17, in which there is a central processor 111, billing module 112, server link module 114, access control module 116 and system failure module 117. It should be noted that this diagram shows the operation of these modules as being interconnected. In an alternative embodiment, all or some of the modules may operate independently of the others.

Figure 18:
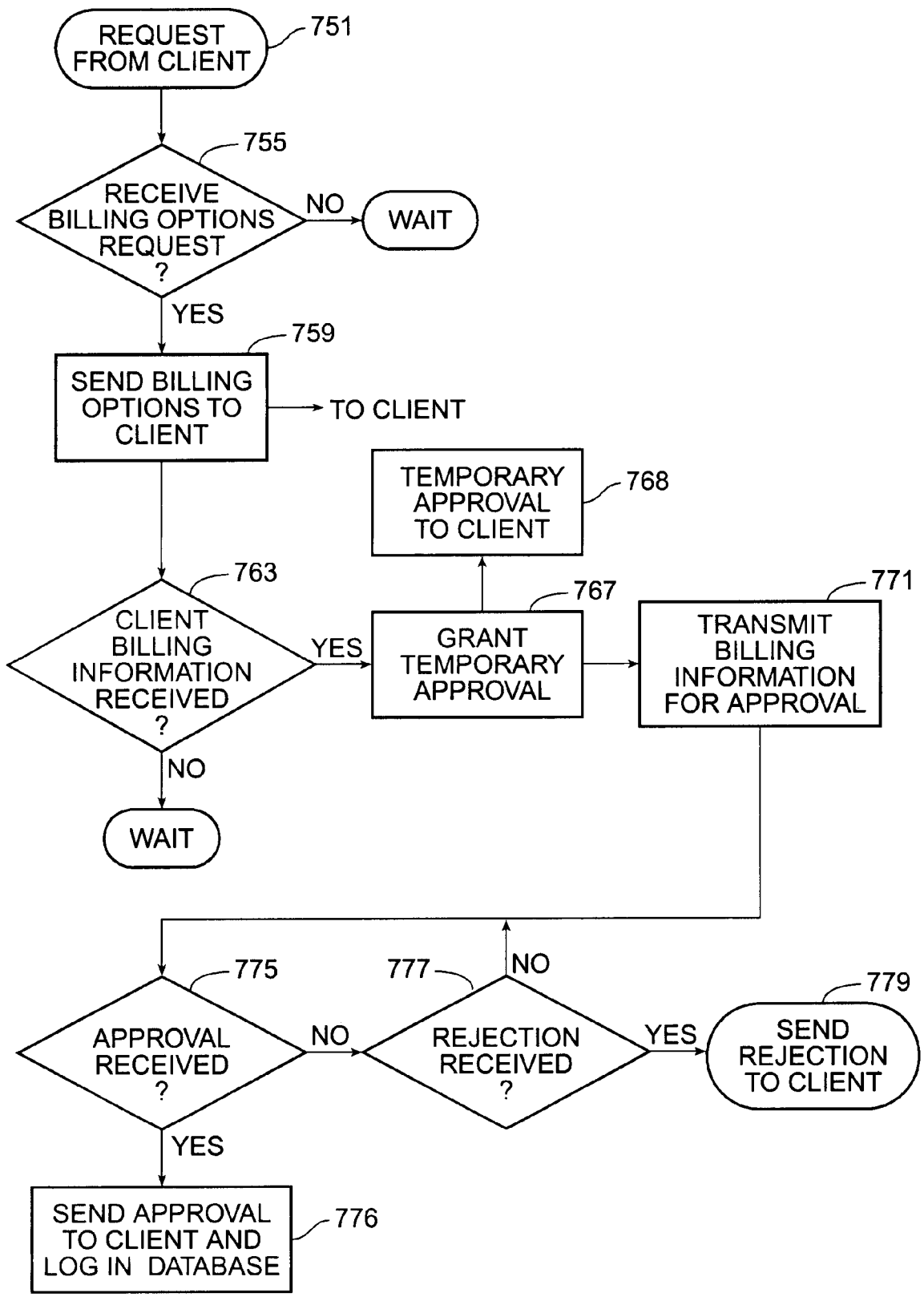
FIG. 18 is a flow diagram associated with a server system in accordance with the present invention.

When the client software 90 requests dynamic assignment of an IP address, as in step 641 (FIG. 9), the server software 110 (or the access control module 116) preferably receives that requests and sends an appropriate response, which is received in the client software in step 643. Likewise, when client software 90 requests a set of billing options, as in step 649, the server software returns a set of billing options as received by the client software in step 651. Operation of billing aspects server software 110 in this regard is illustrated in FIG. 18. The server software 110 receives a request from the client software 90, as indicated in box 751. If no request is received in step 755, it continues to wait as indicated by the "no" arrow. If a request is received in step 755, processing continues, as indicated by "yes" with step 759, in which billing options are sent to the client system. The server waits for receipt of billing information as indicated in step 763.

When the user of the client software 90 in turn transmits the billing information to the server software, as in step 659, the server software, or alternatively a billing module 112, undertakes billing validation procedures. Receipt of this billing information in the server software 110 is indicated as "yes" in step 763. In one embodiment, the server software 110 may grant temporary ECN access approval, as shown in step 767 even before billing validation is accomplished. A temporary approval signal is sent to the client software 768. This embodiment is illustrated in FIG. 18. An advantage of such temporary access is that the user will experience a shorter delay than if access is delayed until billing approval is completed. In one embodiment, the client software 90 displays a message on the display device 75 informing the user that temporary access has been granted, to allow access while the billing approval process is continuing. The temporary approval or final approval is sent to the client software 90, and received as indicated by step 661.

In the billing approval process, the server software 110 transmits the billing information via the ECN 310, to a billing approval server. This transmission is indicated in step 771. If credit card approval is required, typically the billing approval server is a credit bureau or credit card service server. Alternatively, the billing approval request may be sent via the ECN 310 to any billing approval server. For example, if a pre-paid access card is being used, the approval request may be sent to the issuer of the pre-paid access card.

The billing approval server can approve the transaction, approve with credit limit or reject. For example, if the funds in a pre-paid access account have been expended completely, the transaction will be rejected. Alternatively, if a credit card is valid the an approval will be received. Receipt of the approval/rejection is indicated in steps 775 and 777. If approval is received in step 775, an approval signal is sent to the client software 90 as indicted by box 776 and its receipt is indicated in step 661. In addition, the pertinent user information is added to the activity database maintained in the server 110.

Figures 20, 21:
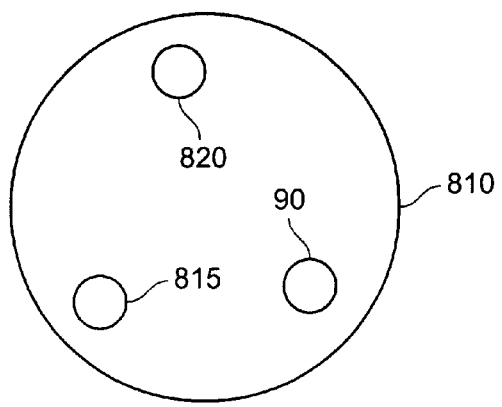
FIG. 20 is chart of a database structure in accordance with an embodiment of the present invention.
FIG. 21 is a representation of an operating system including client software in accordance with the present invention.

An illustration of an activity database is provide in FIG. 20. Additional information, or different information may be stored in the activity database. In the illustrated database, data is indicated for illustration purposes as "XXX", "YYY"

and "NNN". The activity database records various information regarding the activity of the server. In particular, it keeps track of each access port 160 linked with the server and various status data associated with the access port 160. For example, the active/inactive status of the access port may be recorded. For access ports that are active, the pertinent user information, such as identification, billing information and log-in time may be recorded. Data which may be recorded in the database include, for example: client system IP address—which is a temporary address assigned to the client system 10; client network card MAC address—which is a hardware based identifier stored on or associated with the client system interface 60; server network card ID—which is an address of a server interface card; user name—the name of the user associated with the access port 160, and may be used for speedy reconciliation with external databases; port ID—unique access port number, associated with each access port 160 and indicated in FIG. 20 as "1", "2" and "N", with N indicating the Nth access port 160; room number—which can be useful in a hotel, ship, apartment building or office building embodiment, where an access port 160 can be asociated with a particular room, which can promote convenience in billing; charge type—the billing type option selected, such as credit card, smartcard, pre-paid access card, debit card, activity account, hotel room billing and so on; credit card number, access card number, debit card number and so on—which is the identification associated with the billing option selected; credit card holder name—which is the name corresponding to the billing option; expiration date—the expiration date of the billing option, such as credit or debit card expiration date; access card number—the number of a pre-paid access card to be issued by a service provider, port state—such as active, inactive or unavailable; state start time—time when the current port state was entered, which is useful in determining total activity time for billing purposes; unanswered ping count—number of times a client to server communications has failed; billing server communications status—indicates if a billing server or network management server 410 accessible; and billing server authorization—whether approval or rejection of a selected billing option has been received from a billing server system. It should be understood that other data may be recorded in the database and the database entries may change with time as the various access port 160 status changes.

If no approval is received, processing continues with step 777. If a rejection is received, a rejection signal is sent to the client software 90, as indicated in box 779. Receipt of the rejection signal by the client software 90 is indicated in steps 661 and 667 of FIG. 9. If a rejection is not received in step 777, the system continues to wait for an approval or rejection, as indicated by the "no" arrow.

During a period when a client system 10 is in communication with the server 110, the server software monitors the connection. Alternatively, the connection can be monitored by server link monitor module 114. The connection can be broken for any reason such as client system failure, accidental cable disconnection, interference and so on. If a failed connection is detected, the server software 110 or billing module 112 posts the final charges to the billing server for the selected payment server.

The server software 130 also performs a "watchdog" function, which serves to detect server system failures. If a failure is detected, the system automatically re-boots. A system failure module is illustrated in FIG. 17 as item 117.

Figure 19:
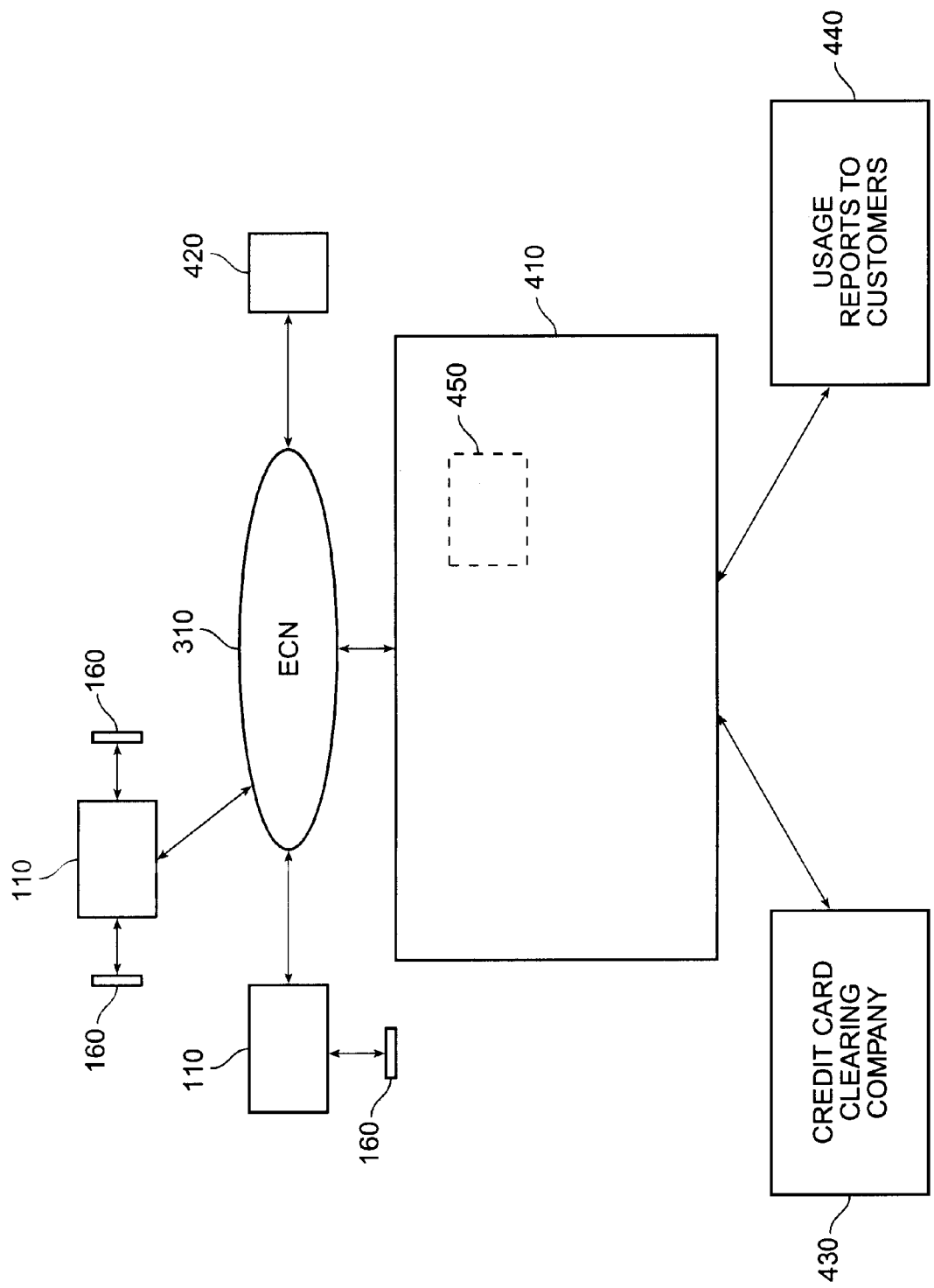
FIG. 19 is a block diagam of a network system in accordance with an embodiment of the present invention.

Preferably, the server system 110 communicates with a network management server 410, which runs network management software. The network management system can perform remote management of a plurality of server systems 110, in its preferred embodiment. In the preferred embodiment, the server system 110 communicates via the ECN 310 (or a private network) with the plurality of server systems 110. This preferred embodiment is illustrated in FIG. 19. Optionally, the one or more communications stations 420 may also be in communication with the network management server 410. These communications stations 420. Such communications stations are described in more detail earlier in this description. In addition, the network management server may be in communication with billing clearing servers 430, such as credit card clearing institutions. Preferably the network management server uses a private or dedicated connections with such clearing servers 430, but alternatively, communications with the clearing servers may occur via an ECN, including for example the Internet. The network management 410 also generates usage reports 440 for mailing to customers. Such usage reports can list billing charges or usage statistics.

The network management server 410 preferably runs network management software 450 for performing billing transaction processing, remote network management and usage statistical reporting. In addition the network management software 450 preferably monitors the servers 110 and communications stations 420 to determine their usage rates, monitor error conditions, detect failures and remotely order reboots if necessary. In addition, the network management software 450 also may provide advertising content and updates of advertising content to the servers 110 and communications stations 420. It should be understood that in one embodiment, a plurality of the servers 110 are used and each of the servers is adapted for communications with a network management server 410 (or plurality of network management servers 410) in the manner that has been described.

In one embodiment, the client software 90 is incorporated in the operating system for the client system. This embodiment is illustrated in FIG. 21. The operating system 810 comprises a plurality of programs, modules etc. configured to operate and coordinate the operation of the components of the client system 10. As illustrative examples, the operating system 810 contains various components including drivers 815, operating instruction set 820, and client software 90. The client software may be integrated in this manner within any opeing system such as UNIX, MAC OS, WINDOWS 95, WINDOWS NT and so on. Preferably in this embodit, the operating system provides a graphical user interface, or desktop screen in which an icon or other form of selection button is provided for easy selection using an input device 70, such as a mouse, touch pad or touch screen.

Thus, it is seen that a system and method for operating and accessing a communications network is provided. One skilled in the art will appreciate that the present invention can be practiced by other than the preferred embodiments which are presented in this description for purposes of illustration and not of limitation, and the present invention is limited only by the claims which follow. It is noted that equivalents for the particular embodiments discussed in this description may practice the invention as well.

What is claimed is:

1. A method of providing communication among a client system, server system and an electronic communication network, the client system including a Central Processor Unit (CPU), volatile working memory associated with the CPU, a communications interface and the client system running client software for managing the communications between the client system and the electronic communications network, the server system running server software for managing communications between a plurality of client systems and the electronic communications network, the method comprising:

providing a set of billing options, the billing options including at least one technique for making a monetary payment;

specifying a billing preferences and transmitting the billing preference to the server system from the client system;

transmitting a billing approve/reject signal from the server system to the client system;

conducting two-way communications between the electronic communications network and the client system via the server system if an approve signal is provided in the transmitting a billing approve/reject signal step.

2. A method as set out in claim 1 further comprising the step of assigning an IP address to the client system, prior to the step of providing a set of billing options.

3. A method as set out in claim 1 further comprising the following steps prior to the step of providing a set of billing options:

determining if the client software on the client system is missing any components necessary for communications with the electronic communications network;

providing to the client system from the server system missing components of the client software on the client system; and installing missing components of the client software on the client system.

4. A method as set out in claim 1 further comprising the following steps prior to the step of providing a set of billing options:

determining if the client software on the client system is missing any components necessary for communications with the electronic communications network;

searching the client system for install files containing the any said missing components; and installing any missing components of the client software found in the searching step.

5. A method as set out in claim 1 further comprising the following steps prior to the step of providing a set of billing options:

determining if the client software on the client system is missing any components necessary for communications with the electronic communications network;

searching the client system for install files containing the any said missing components;

providing to the client system from the server system any additional missing components that are not found in the searching step; and installing any missing components of the client software found in the searching step.

6. A method as set out in claim 1 further comprising the following steps prior to the step of providing a set of billing options:

determining if the client software on the client system has any outdated components;

providing to the client system from the server system a current version corresponding to each of said outdated components found in said determining step; and installing said current version corresponding to each of said outdated components found in said determining step.

7. A method as set out in claim 1 further comprising the following steps prior to the step of providing a set of billing options:

determining if the client system has proper network configuration and registry settings to accomplish communication with the electronic communications network;

if proper settings are found in said determining step, storing said settings in volatile working memory;

requesting assignment of an IP address from the server system by the client system; and receiving said IP address in the client system from the server system.

8. A method as set out in claim 7 further comprising the following steps before the step of providing a set of billing options and after the step of receiving said IP address:

sending a request from the client system to the server system for a set of available billing options.

9. A method as set out in claim 3 further comprising the following steps prior to the step of providing a set of billing options:

determining if the client system has proper network configuration and registry settings to accomplish communication with the electronic communications network;

if proper settings are found in said determining step, storing said settings in volatile working memory;

requesting assignment of an IP address from the server system by the client system; and receiving said IP address in the client system from the server system.

10. A method as set out in claim 1 wherein a plurality of client systems are in communication with the server system, further comprising the steps of:

maintaining a database in the server system tracking identifying information for each of said client systems in communication with said server system;

for each said client system, recording in said database said billing information for each respective client system and data representing the amount of monetary charges accumulated by each of said respective client systems.

11. A method as set out in claim 10 wherein said data representing the amount of monetary charges includes data representing connect time.

12. A method as set out in claim 10 further comprising the steps of:

recording data representing the total amount of monetary charges for each respective client system following disconnection of client system;

transmitting said total amount of monetary charges to a network management system; and processing account billing corresponding to the total amount of monetary charges in the network management system.

13. A method of providing communication among a client system, server system and an electronic communication network, the client system including a Central Processor Unit (CPU), volatile working memory associated with the CPU, a communications interface and the client system running client software for managing the communications between the client system and the electronic communications network, the server system running server software for managing communications between a plurality of client systems and the electronic communications network, the method comprising:

providing a set of billing options, the billing options including at least one technique for making a monetary payment;

specifying a billing preferences and transmitting the billing preference to the server system from the client system;

sending an approval inquiry from the server system to a remote approval system;

sending a temporary approval signal from the server system to the client system before an approval signal is received by the server system from the remote approval system; and conducting two-way communications between the electronic communications network and the client system.

14. A method as set out in claim 13 further comprising the steps of:

receiving a rejection signal in the server system from the remote approval system;

transmitting a rejection signal from the server system to the client system; and discontinuing two-way communications between the electronic communications network and the client system.

15. A method as set out in claim 13 further comprising the steps of:

sending a rejection signal from the server system to the client system; and transmitting additional billing information from the client system to the server system.

16. A communication system providing communication among a client system, server system and an electronic communication network, the client system running client software for managing the communications between the client system and the electronic communications network, the server system running server software for managing communications between a plurality of client systems and the electronic communications network, the communications means comprising:

means for providing a set of billing options, the billing options including at least one technique for making a monetary payment;

means for specifying a billing preferences and transmitting the billing preference to the server system from the client system;

means for transmitting a billing approve/reject signal from the server system to the client system;

means for conducting two-way communications between the electronic communications network and the client system via the server system if an approve signal received in the client system.

17. A communications system as set out in claim 16 further comprising the means for assigning an IP address to the client system.

18. A communications system as set out in claim 16 further comprising:

means for determining if the client software on the client system is missing any components necessary for communications with the electronic communications network;

means for providing to the client system from the server system missing components of the client software on the client system; and means for installing missing components of the client software on the client system.

19. A method as set out in claim 19 further comprising:

means for determining if the client system has proper network configuration and registry settings to accomplish communication with the electronic communications network;

means for storing said settings in volatile working memory;

means for requesting assignment of an IP address from the server system by the client system; and means for receiving said IP address in the client system from the server system.

20. A communications system as set out in claim 16 further comprising:

means for determining if the client software on the client system is missing any components necessary for communications with the electronic communications network;

means for searching the client system for install files containing the any said missing components; and means for installing any missing components of the client software.

21. A communications system as set out in claim 16 further comprising:

means for determining if the client software on the client system is missing any components necessary for communications with the electronic communications network;

means for searching the client system for install files containing the any said missing components;

means for providing to the client system from the server system additional missing components; and means for installing any missing components of the client software provided to the client system by the means for providing.

22. A communications system as set out in claim 16 further comprising:

means for determining if the client software on the client system is has any outdated components;

means for providing to the client system from the server system a current version outdated components; and means for installing said current version corresponding to each of said outdated components.

23. A communications system as set out in claim 16 further comprising:

means for determining if the client system has proper network configuration and registry settings to accomplish communication with the electronic communications network;

means for storing said settings in volatile working memory;

means for requesting assignment of an IP address from the server system by the client system; and means for receiving said IP address in the client system from the server system.

24. A communications system as set out in claim 23 further comprising:

means for sending a request from the client system to the server system for a set of available billing options.

25. A method as set out in claim 16 wherein a plurality of client systems are in communication with the server system, further comprising:

means for maintaining a database in the server system tracking identifying information for each of said client systems in communication with said server system;

means for recording in said database for each said client system, said billing information for each respective client system and data representing the amount of monetary charges accumulated by each of said respective client systems.

26. A communications system as set out in claim 25 wherein said data representing the amount of monetary charges includes data representing connect time.

27. A communications system as set out in claim 25 further comprising:

means for recording data representing the total amount of monetary charges for each respective client system following disconnection of client system;

means for transmitting said total amount of monetary charges to a network management system; and means for processing account billing corresponding to the total amount of monetary charges in the network management system.

28. A data storage medium including machine readable code thereon for use in a client computer system having a Central Processor Unit (CPU), volatile working memory associated with the CPU, a communications interface, and means for reading code from the storage medium, the storage medium comprising:

means for receiving a set of billing options, the billing options including at least one technique for making a monetary payment;

means for specifying a billing preferences and transmitting the billing preference to the server system from the client system;

means for receiving a biling approve/reject signal from a server system to the client system;

means for conducting two-way communications between an electronic communications network and the client system via the server system if an approve signal is received.

29. A data storage medium including machine reaable thereon for use in a server computer system having means for reading code from the storage medium, the server system being adapted for communication with a plurality of client systems, the storage medium comprising:

means for providing a set of billing options, the billing options including at least one technique for making a monetary payment;

means for receiving a billing preference from one of the client systems;

means for transmitting a billing approve/reject signal from the server system to one of the client systems;

means for accommodating two-way communications between an electronic communications network and any of the plurality of client systems via the server system if an approve signal received in the client system.

30. A computer operaing system having a communications feature for providing communication among a client system, server system and an electronic communication network, the client system running client software for managing the communications between the client system and the electronic communications network, the server system running server software for managing communications between a plurality of client systems and the electronic communications network, the communications feature comprising:

means for receiving a set of billing options from said server system, the billing options including at least one technique for making a monetary payment;

means for specifying a billing preferences and transmitting the billing preference to the server system from the client system;

means for receiving a billing approve/reject signal from the server system to the client system;

means for conducting two-way communications between the electronic communications network and the client system via the server system if an approve signal is received from the server system. signal step.

* * * * *

UNITED STATES PATENT AND TRADEMARK OFFICE
CERTIFICATE OF CORRECTION

PATENT NO. : 6,233,604 B1
DATED : May 15, 2001
INVENTOR(S) : Peter Van Horne, Keith Olson and Kevin Miller It is certified that error appears in the above-identified patent and that said Letters Patent is hereby corrected as shown below:

Column 1,
Line 5, replace "5,897,430" with -- 5,987,430 --.
Line 27, replace "TCPIP" with -- TCP/IP --.
Line 49, replace "FIP" with -- FTP --.

Column 2,
Line 17, delete "than".

Column 3,
Line 53, after "equipment"" insert -- ) --.
Line 54, delete "is".
Line 66, after "access" insert -- to --.

Column 4,
Line 13, replace "linges" with -- linkages --.

Column 6,
Line 1, after "is" insert -- a --.

Column 7,
Line 44, replace "communications" with -- communicates --.

Column 8,
Line 39, replace "tennials" with -- terminals --.

Column 12,
Line 37, replace "connection" with -- connected --.
Line 48, replace "show" with -- shown --.

UNITED STATES PATENT AND TRADEMARK OFFICE
CERTIFICATE OF CORRECTION

PATENT NO. : 6,233,604 B1
DATED : May 15, 2001
INVENTOR(S) : Peter Van Horne, Keith Olson and Kevin Miller It is certified that error appears in the above-identified patent and that said Letters Patent is hereby corrected as shown below:

Column 13,
Line 37, replace "by" with -- be --.
Line 57, after "illustrated" insert -- , --.
Line 61, before "received" insert -- was --.

Column 15,
Line 7, after "734" insert -- . --.
Line 62, replace "he" with -- the --.
Line 66, replace "consst" with -- consist --.

Column 16,
Line 56, after "valid" insert -- , --, and delete "the".

Column 22,
Line 1, replace "19" with -- 18 --, and replace "method" with -- communications system --.

Column 24,
Line 36, delete "signal step.".

Signed and Sealed this

Thirtieth Day of April, 2002

Attest:

JAMES E. ROGAN
Attesting Officer    Director of the United States Patent and Trademark Office